(12) United States Patent
Shum et al.

(10) Patent No.: US 6,750,860 B1
(45) Date of Patent: Jun. 15, 2004

(54) RENDERING WITH CONCENTRIC MOSAICS

(75) Inventors: Heung-Yeung Shum, Bellevue, WA (US); Li-Wei He, Redmond, WA (US); Qifa Ke, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/309,753

(22) Filed: May 11, 1999

Related U.S. Application Data

(63) Continuation of application No. 09/222,488, filed on Dec. 28, 1998, now abandoned.

(51) Int. Cl.[7] ............................................. G06T 15/00
(52) U.S. Cl. ............................................... 345/419
(58) Field of Search ............................... 345/419, 420, 345/426, 427, 428, 619

(56) References Cited

U.S. PATENT DOCUMENTS 5,831,619 A    11/1998   Nakagawa et al. ......... 345/419

FOREIGN PATENT DOCUMENTS

| IL | 98 34195 A | 8/1998 |
| WO | 99 06943 A | 2/1999 |

OTHER PUBLICATIONS

Werner et al., "Rendering Real–World objects using view interpolation", *Proceedings of the International Conference on Computer Vision*, U.S., Los Alamitos, IEEE Comp. Soc. Press, Jun. 20, 1995, pp. 957–962.
McMillan et al., "Plenoptic Modelling: An Image–Based Rendering System", *Computer Graphic Proceedings (SIG-GRAPH)*, U.S., New York, IEEE, Aug. 6, 1995, pp. 39–46.
Kang et al., "3–D Scene data Recovery Using Omnidirectional Multivaseline Stereo", *International Journal of Computer Vision*, U.S., Kluwer Academic Publishers, Norwell, vol. 25 No. 2, Nov. 1, 1997, pp. 167–183.

(List continued on next page.)

*Primary Examiner*—Phu K. Nguyen
(74) *Attorney, Agent, or Firm*—Klarquist Sparkman, LLP

(57) ABSTRACT

An image based system and process for rendering novel views of a real or synthesized 3D scene based on a series of concentric mosaics depicting the scene. In one embodiment, each concentric mosaic represents a collection of consecutive slit images of the surrounding 3D scene taken from a different viewpoint tangent to a circle on a plane within the scene. Novel views from viewpoints within circular regions of the aforementioned circle plane defined by the concentric mosaics are rendered using these concentric mosaics. Specifically, a slit image can be identified by a ray originating at its viewpoint on the circle plane and extending toward the longitudinal midline of the slit image. Each of the rays associated with the slit images needed to construct a novel view will either coincide with one of the rays associated with a previously captured slit image, or it will pass between two of the concentric circles on the circle plane. If it coincides, then the previously captured slit image associated with the coinciding ray can be used directly to construct part of the novel view. If the ray passes between two of the concentric circles of the plane, then the needed slit image is interpolated using the two previously captured slit images associated with the rays originating from the adjacent concentric circles that are parallel to the non-coinciding ray. If the objects in the 3D scene are close to the camera, depth correction is applied to reduce image distortion for pixels located above and below the circle plane. In another embodiment, a single camera is used to capture a sequence of images. Each image includes image data that has a ray direction associated therewith. To render an image at a novel viewpoint, multiple ray directions from the novel viewpoint are chosen. Image data is combined from the sequence of images by selecting image data that has a ray direction substantially aligning with the ray direction from the novel viewpoint.

78 Claims, 19 Drawing Sheets

OTHER PUBLICATIONS

P. Beardsley, P. Torr, A. Zisserman, "3D Model Acquisition from Extended Image Sequences", Fourth European Conference on Computer Vision, vol. 2, pp. 683–695, Cambridge, England, Apr. 1996.

S.E. Chen, "QuickTime VR—An Image–based approach to Virtual Environment Navigation", Computer Graphics (SIGGRAPH '95), pp. 29–38, Aug. 1995.

S. Chen and L. Williams, "View Interpolation for Image Synthesis", Computer Graphics (SIGGRAPH '93), pp. 279–288, Aug. 1993.

P.E. Debevec, C.J. Taylor, and J. Malik, "Modeling and Rendering Architecture from Photographs: A Hybrid geometry—and Image Based Approach", Computer Graphics (SIGGRAPH '96), pp. 11–20, Mar. 1998.

S.J. Gortler, R. Grzeszczuk, R.Szeliski, and Zeller, C., "The Lumigraph", Computer Graphics Proceedings, Annual Conference Series, pp. 43–54, Proc. SIGGRAPH '96 (New Orleans), Aug. 1996, ACM SIGGRAPH.

R. Gupta and R.I. Hartley, "Linear Pushbroom Cameras", IEEE Transactions on Pattern Analysis and Machine Intelligence, 19(9):963–975, Sep. 1997.

S.B. Kang and R. Szeliski, "3–D Scene Data Recovery using Omnidirectional Multibaseline Stereo", IEEE Computer Society Conference on Computer Vision and Pattern Recognition (CVPR'96), pp. 364–370, San Francisco, California, Jun. 1996.

M. Levoy and P. Hanrahan, "Light Field Rendering", Computer Graphics Proceedings, Annual Conference Series, pp. 31–42, Proc. SIGGRAPH '96 (New Orleans), Aug. 1996.

L. McMillan and G. Bishop, "Plenoptic Modelling: A Image Based Rendering System", Computer Graphics (SIGGRAPH '95), pp. 39–46, Aug. 1995.

S. Mann and R.W. Picard, Virtual Bellows: Constructing High–Quality Stills from Video:, First IEEE International Conference on Image Processing (ICIP–94), vol. 1, pp. 36–367, Austin, Texas, Nov. 1994.

S. Nayar, "Catadioptric Omnidirectional Camera", IEEE Computer Society Conference on Computer Vision and Pattern recognition (CVPR '97), pp. 482–488, San Juan, Puerto Rico, Jun. 1997.

S. Peleg and J., Herman, "Panoramic Mosaics by Manifold Projection", IEEE Computer Society Conference on Computer Vision and Pattern Recognition (CVPR '97), pp. 338–343, San Juan, Puerto Rico, Jun. 1997.

P. Rademacher and Bishop G., "Multiple–Center–of–Projection Images", Computer Graphics Proceedings, Annual Conference Series, pp. 199–206, Proc. SIGGRAPH '98 (Orlando), Jul. 1998, ACM SIGGRAPH.

P.P. Sloan, M.F. Cohen, and S.J. Gortler, "Time Critical Lumigraph Rendering", Symposium on Interactive 3D Graphics, pp. 17–23, Providence, RI, USA, 1997.

S.M. Seitz and C.M. Dyer, "View Morphing", Computer Graphics Proceedings, Annual Conference Series, pp. 21–30, Proc. SIGGRAPH '96 (New Orleans), Aug. 1996 ACM SIGGRAPH.

J. Shade, S. Gorler, L.W. He, and R. Szelski, Layered Depth Images, Computer Graphics Proceedings, Annual Conference Series, pp. 231–242, Proc. SIGGRAPH '98 (Orlando), Jul. 1998, ACM SIGGRAPH.

R. Szeliski and H.Y. Shum, "Creating Full View Panoramic Image Mosaics and Texture–mapped models", Computer Graphics (SIGGRAPH'97), pp. 251–258, Aug. 1997.

Y. Sato, M. Wheeler, and K. Ikeuchi, "Object Shape and Reflectance Modeling from Observation", Computer Graphics Proceedings, Annual Conference Series, pp. 379–387, Proc. SIGGRAPH '97 (Los Angeles), Aug. 1997, ACM SIGGRAPH.

R. Szeliski, Video Mosaics for Virtual Environments, IEEE Computer Graphics and Applications, pp. 22–30, Mar. 1996.

D. N. Wood et al., "Multiperspective Panoramas for Cel Animation", Computer Graphics Proceedings, Annual Conference Series, pp. 243–250, Proc. SIGGRAPH '97 (Los Angeles), Aug. 1997, ACM SIGGRAPH.

Y. Xiong and K. Turkowski, "Creating Image–Based VR Using a Self–Calibrating Fisheye Lens", IEEE Computer Society Conference on Computer Vision and Pattern Recognition (CVPR '97), pp. 237–243, San Juan, Puerto Rico, Jun. 1997.

Y. Yu and J. Malik, Recovering Photometric Properties of Architectural Scenes from Photographs, Computer Graphics (SIGGRAPH '96), pp. 207–218, Jul. 1998.

Adelson, E.H. and Bergen, J., "The Plenoptic Function and the Elements of Early Vision", *Computational Models of Visual Processing*, pp. 3–20, MIT Press, Cambridge MA, 1991.

Benton, S.A., "Survey of Holographic Stereograms", *Proc. SPIE* vol. 367 Int., Soc. Eng., pp. 15–19, 1983.

Faugeras, O.D. et al., "3–D Reconstruction of Urban Scenes from Sequences of Images", *Computer Vivion and Image Understanding* 69(3):292–309, Mar. 1998.

Laveau, S. and Faugeras, O., "3–D Scene representation as a collection of Images and Fundamental Matrices" *Technical lReport 2205,* INRIA–Sofia Antipolis, Feb. 1994.

Rousso, B. et al., "Universal Mosaicing Using Pipe Projection" *Siexth International Conference on Computer Vision* (ICCV'98), pp. 945–952, Bombay, Jan. 1998.

Wong, T. et al., "Image–Based Rendering with Controllable Illumination" *Proceedings of the $8^{th}$ Eurographics Workshop on Rendering,* pp. 13–22, St. Etienne, France, Jun. 1997.

Zheng, J.Y. and Tsuji, S., "Panoramic Representation of Scenes for Route Understanding" *Proc. Of the $10^{th}$ Int. Conf. Pattern Recognition,* pp. 161–167, Jun. 1990.

E.H. Adelson and J. Bergen, "The Plenoptic Function and the Elements of Early Vision" *Computational Models of Visual Processing,* pp. 3–20, MIT Press, Bambridge, MA, 1991.

S.J. Gortler, R. Grzeszczuk, et al., "The Lumigraph" *Computer Graphics Proceedings, Annual Conference Series,* pp. 43–54, Proc. SIGGRAPH'96 (New Orleans), Aug. 1996. ACM SIGGRAPH.

S. Chen, "Quicktime VR" *Computer Graphics Proceedings,* Annual Conference Series, pp. 29–38, Proc. SIGGRAPH '95, Aug. 1995. ACM SIGGRAPH.

R. Szeliski and H. Shum, "Creating Full View Panoramic Image Mosaics and Texture–mapped models" *Computer Graphics Proceedings, Annual Conference Series,* pp. 251–258, Proc. SIGGRAPH '97, Aug. 1997. ACM SIGGRAPH.

R. Gupta and R.I. Hartley, "Linear Pushbroom cameras" *IEEE Transactions on Pattern Analysis and Machine Intelligence,* 99(9):963–975, Sep. 1997.

S.B. Kang and R. Szeleski, "3–D Scene Data Recovery Using Omnidirectional Multibase–Line Stereo" *IEEE Computer Society Conference on Computer Vision and Pattern Recognition (CVPR'96)*, pp. 364–370, San Francisco, California, Jun. 1996.

M. Levoy and P. Hanrahan, "Light Field Rendering" *Computer Graphics Proceedings, Annual Conference Series,* pp. 31–42, Proc. SIGGRAPH'96 (New Orleans), Aug. 1996. ACM SIGGRAPH.

L. McMillan and G. Bishop, "Plenoptic Modeling: An Image–Based Rendering System" *Computer Graphics (SIGGRAPH '95)*, pp. 39–46, Aug. 1995.

S. Peleg and J. Herman, "Panoramic Mosaics by Manifold Projection"*IEEE Computer Society Conference on Computer Vision and Pattern Recognition (CVPR'97)*, pp. 338–343, San Juan, Puerto Rico, Jun. 1997.

P. Rademacher and G. Bishop, "Multiple–Center–of–Projection Images" *Computer Graphics Proceedings, Annual Conference Series,* pp. 199–206, Proc. SIGGRAPH'98 (Orlando), Jul. 1988. ACM SIGGRAPH.

B. Rousso, et al., "Universal Mosaicing Using Pipe Projection" *Sixth International Conference on Computer Vision,* (ICCV'98), pp. 945–952, Bombay, Jan. 1998.

D.N. Wood, et al.,"Multiperspective Panoramas for Cel Animation" *computer Graph–ics Proceedings, Annual Conference Series,* pp. 243–250; Proc. SIGGRAPH'97 (Los Angeles), Aug. 1997. ACM SIGGRAPH.

T. Wong, et al., "Image–Based Rendering with Controllable Illumination" *Proceedings of the $8^{th}$ Eurographics Workshop on Rendering,* pp. 13–22, St. Etienne, France, Jun. 1997.

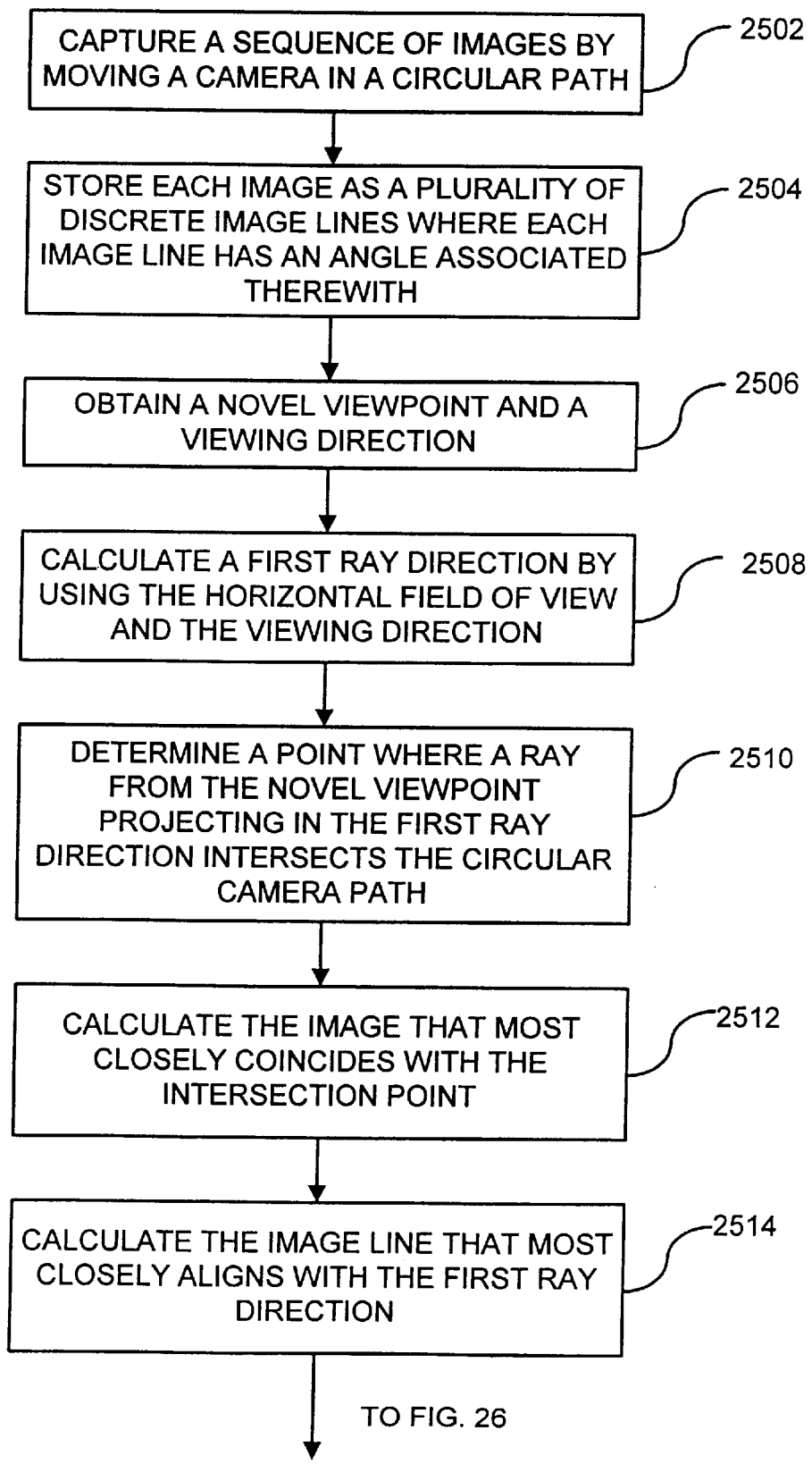

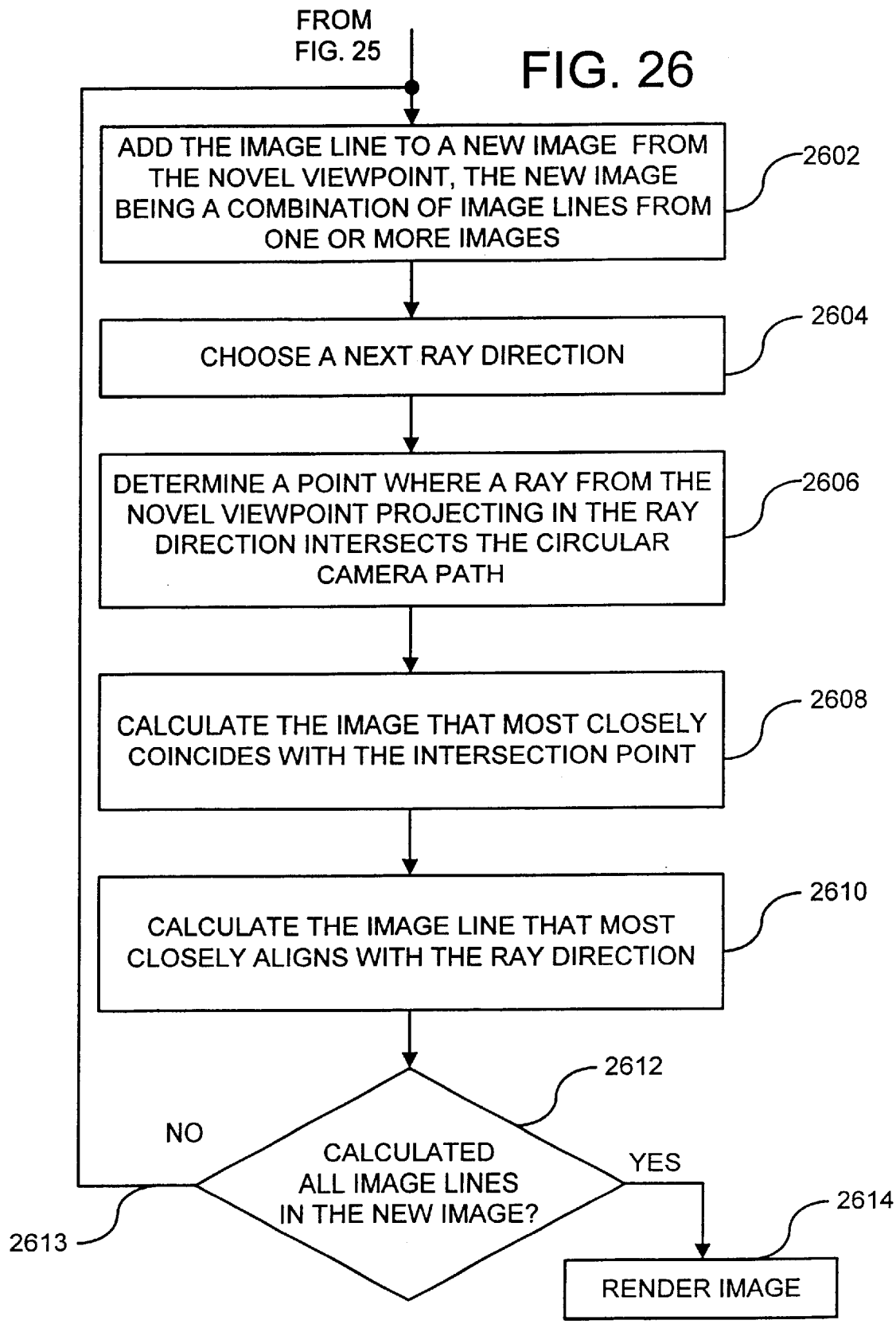

RENDERING WITH CONCENTRIC MOSAICS

RELATED APPLICATION DATA

This application is a continuation-in-part of U.S. patent application Ser. No. 09/222,488, filed Dec. 28, 1998 now abandoned which is hereby incorporated by reference.

BACKGROUND

1. Technical Field

The invention is related to an image-based rendering system and process for rendering novel views of a 3D scene, and more particularly, to a system and process for rendering these novel views using concentric mosaics.

2. Background Art

Traditional rendering approaches often involve constructing or recovering a complete geometric and photometric model of a 3D scene. These approaches are attractive as they allow graphics elements (such as new lights, shadows, etc.) to be readily added to the model. However, these approaches are also complex and computationally intensive. In many cases, it is desired to render views of a 3D scene more simply without the complexity and excessive processing requirements of a geometric/photometric rendering approach. If this is the case, a different method of rendering a view of the scene could be taken. Specifically, an image-based rendering process could be employed. One such image-based rendering approach foregoes the need for a geometric/photometric model of a scene, and instead uses Adelson and Bergen's plenoptic function [AB91] to describe the scene. The original Adelson and Bergen work defined a 7D plenoptic function as the intensity of light rays passing through the camera center at every location $(V_x, V_y, V_z)$ at every possible angle $(\theta, \phi)$, for every wavelength $\lambda$, at every time t, i.e., $$P_7 = P(V_x, V_y, V_z, \theta, \phi, \lambda, t) \quad (1)$$

It is also possible to add light source directions in the plenoptic function. [WHON97].

In recent years a number of image-based rendering techniques have been proposed to model and render real or synthetic scenes and objects based on simplifying the plenoptic function. For example, techniques have been proposed to construct a complete 5D plenoptic function by McMillan and Bishop [MB95]:

$$P_5 = P(V_x, V_y, V_z, \theta, \phi) \quad (2)$$

In this work two of the variables in the original equation are dropped, namely time t (therefore assuming a static environment) and light wavelength $\lambda$ (hence assuming a fixed lighting condition). In addition, this work introduced the concept of interpolating plenoptic functions from a few discrete samples using cylindrical panoramas.

A 4D parameterization of the plenoptic function has also been proposed. It was observed in both the Lightfield [LH96] and Lumigraph [GGSC96] systems that by staying outside a convex hull or bounding box of an object, the 5D complete plenoptic function can be simplified to a 4D lightfield plenoptic function, i.e., $$P_4 = P(u, v, s, z) \quad (3)$$

where (u, v) and (s, z) parameterize two bounding planes of the convex hull. The reverse is also true if camera views are restricted inside a convex hull.

There has even been 2D simplifications proposed (e.g., cylindrical panoramas [Chen95] and spherical panoramas [SS97]) where the viewpoint in the scene is fixed and only viewing directions can be changed, i.e., $$P_2 = P(\theta, \phi) \quad (4)$$

The 2D embodiment of the plenoptic function is the easiest to construct. However, the 2D parameterization of the plenoptic function does not allow novel views from different viewpoints within the scene to be rendered. It would be possible to render novel views using the 5D or 4D embodiments of the plenoptic function. It is, however, very difficult to construct a 5D complete plenoptic function [MB95, KS96] because the feature correspondence is a difficult problem. In addition, while the 4D embodiment is not too difficult to construct because of its unique parameterization, the resulting lightfield is large even for a small object (therefore small convex hull). This presents problems when trying to render novel views, and to date a real-time walk-through a real 3D scene has not been fully demonstrated.

It is noted that in the preceding paragraphs, as well as in the remainder of this specification, the description refers to various individual publications identified by an alphanumeric designator contained within a pair of brackets. For example, such a reference may be identified by reciting, "reference [AB91]" or simply "[AB91]". Multiple references will be identified by a pair of brackets containing more than one designator, for example, [PH97, W+97, RG98, RPIA98, GH97]. A listing of the publications corresponding to each designator can be found at the end of the Detailed Description section.

SUMMARY

The invention is directed toward an image-based rendering system and process for rendering novel views of a real or synthesized 3D scene based on a series of concentric mosaics depicting the scene.

In one embodiment of the present invention, each concentric mosaic represents a collection of consecutive slit images of the surrounding 3D scene taken in a direction tangent to a viewpoint on a circle on a plane within the scene. The mosaics are concentric in that the aforementioned circles on the plane are concentric. This system and process is based on a unique 3D parameterization of the previously described plenoptic function that will hereafter be referred to as concentric mosaics. Essentially, this parameterization requires that the concentric mosaics be created by constraining "camera" motion on concentric circles in the circle plane within the 3D scene. Once created, the concentric mosaics can be used to create novel views of the 3D scene without explicitly recovering the scene geometry.

Specifically, each concentric mosaic is generated by capturing slit-shaped views of the 3D scene from different viewpoints along one of the concentric circles. Each captured slit image is uniquely indexed by its radial location (i.e., which concentric mosaic it belongs to) and its angle of rotation (i.e., where on the mosaic). The radial location is the radius of the concentric center on which the slit image was captured, and the angle of rotation is defined as the number of degrees from a prescribed beginning on the concentric circle to the viewpoint from which the slit image was captured. The height of the slit image reflects the vertical field of view of the capturing camera. Preferably, slit images are captured at each viewpoint on the concentric circle in both directions tangent to the circle. If so, the unique identification of each slit image also includes an indication as to which of the two tangential directions the slit image was captured.

Novel views from viewpoints on the aforementioned circle plane are rendered using the concentric mosaics composed of slit images. Specifically, the viewpoint of a novel view may be anywhere within a circular region defined by the intersection of the outermost concentric mosaic with the circle plane. The novel view image consists of a collection of side-by-side slit images, each of which is identified by a ray emanating from the viewpoint of the novel view on the circle plane and extending toward a unique one of the slit images needed to construct the novel view. Each of the rays associated with the slit images needed to construct the novel view will either coincide with a ray identifying one of the previously captured slit images in the concentric mosaics, or it will pass between two of the concentric circles on the circle plane. If it coincides, then the previously captured slit image associated with the coinciding ray can be used directly to construct part of the novel view. However, if the ray passes between two of the concentric circles of the plane, a new slit image is formed by interpolating between the two previously captured slit images associated with the rays originating from the adjacent concentric circles that are parallel to the non-coinciding ray of the novel view. This interpolation process preferably includes determining the distance separating the non-coinciding ray from each of the two adjacent parallel rays. Once these distances are determined, a ratio is computed for each slit image associated with the parallel rays based on the relative distance between the non-coinciding ray and each of the parallel rays. This ratio represents how much weight the slit image will be given in a blending process that combines the two slit images associated with the parallel rays to form an interpolated slit image. Once all the slit images needed to create the novel view have been identified, or created by interpolation, the novel view can be rendered by arranging the slit images in a side-by-side fashion in an order dictated by the rays associated with the novel view.

The rendering system and process can also be modified to mitigate the effects of potential distortions in the rendered images. These distortions can arise when objects depicted in a novel view are relatively close because the slit images used to construct the novel views were captured at viewpoints on the circle plane that are different from the viewpoint of the novel view. The potential distortion can be compensated for using a scaling process. This scaling process includes first determining the average distance from the viewpoint of each captured slit image to the objects of the 3D scene depicted therein. Then, for each captured slit image found to coincide with one of the slit images needed to construct a novel view, and for each interpolated slit image, the average distance from the objects of the 3D scene depicted in the captured slit image to the viewpoint of the novel view is determined. A ratio is computed by dividing the first distance by the second distance. This ratio is used to scale the vertical dimension of the slit image.

The system used to create the concentric mosaics typically uses multiple slit-image cameras that are rotated around a center point. In another embodiment of the present invention, a single camera, such as a video camera, may be used instead. At each rotation angle, a regular image is captured using the video camera, rather than a slit image, to obtain a sequence of images. A regular image includes multiple image lines wherein each image line is associated with a ray direction (a ray direction is an angle at which a light ray enters the lens of the camera). A concentric mosaic is formed by combining each image line having the same ray direction in the sequence of images. For example, the $20^{th}$ image line taken from each image may be used to form a concentric mosaic. An image from a novel viewpoint may then be rendered using the same techniques described for the slit-image embodiment.

Using the single camera embodiment, an image from a novel viewpoint may be rendered without rebinning the images into concentric mosaics. Specifically, multiple ray directions are calculated from the novel viewpoint. For each ray direction, an image line is obtained from the sequence of images that has a ray direction substantially aligning with the ray direction from the novel viewpoint. The obtained image lines are then combined to render an image from the novel viewpoint.

In addition to the just described benefits, other advantages of the present invention will become apparent from the detailed description which follows hereinafter when taken in conjunction with the accompanying drawings.

DESCRIPTION OF THE DRAWINGS

FIG. 25 is a flow chart of a method for rendering an image using the embodiment of FIG. 15.

FIG. 26 is a flow chart of additional steps that may be used with the rendering technique of FIG. 25.

DETAILED DESCRIPTION

In the following description of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
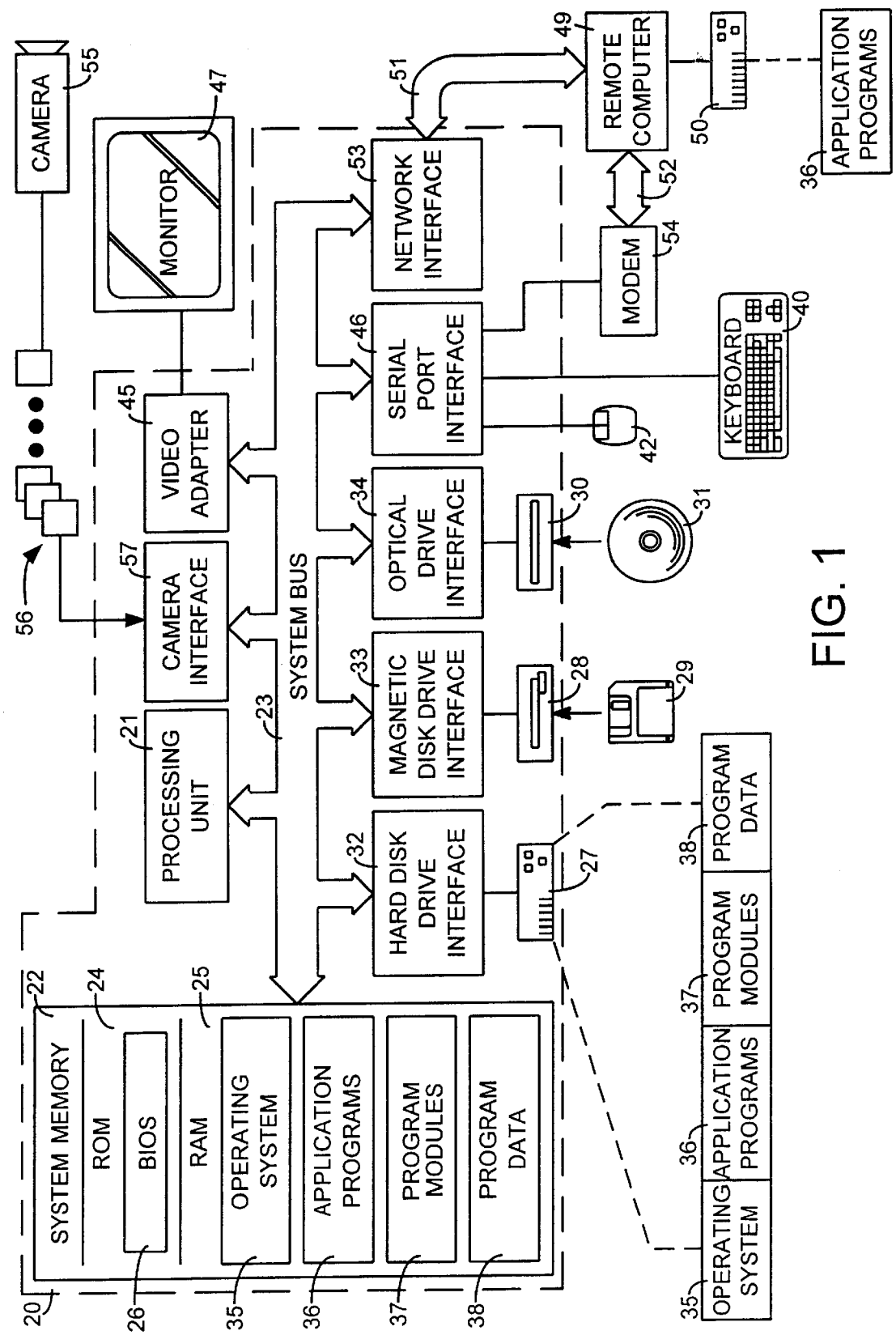
FIG. 1 is a diagram depicting a general-purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, CDs, DVDs, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42 (such as a mouse). Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

Figure 2:
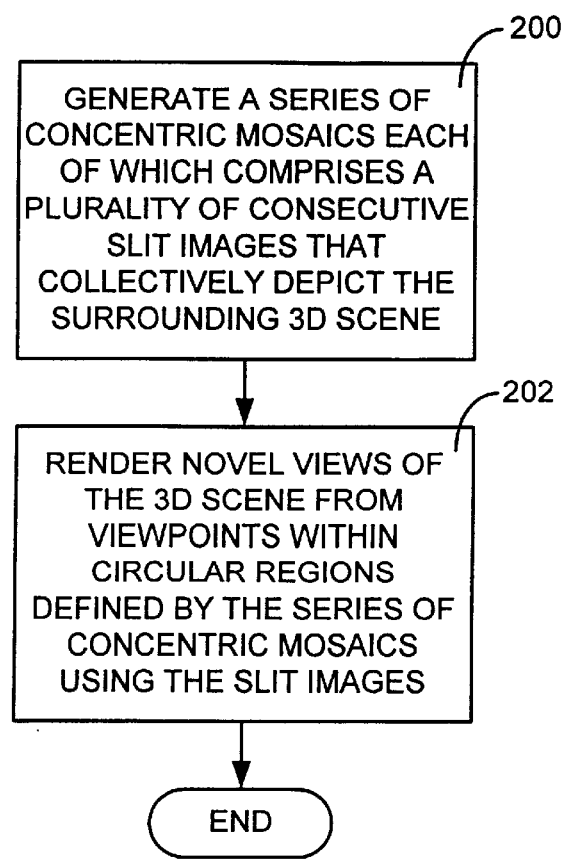
FIG. 2 is a flow chart diagramming an overall process for creating concentric mosaics and rendering novel views according to one embodiment of the present invention.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the program modules embodying the invention. In general, the present invention is embodied in an image-based rendering system and process involving the rendering of novel views of a 3D scene based on a series of concentric mosaics. The concentric mosaics are essentially a series of the manifold mosaics [PH97, W+97, RG98, RPIA98, GH97] that have been constructed from slit images captured by constraining camera motion on concentric, coplanar circles within the 3D scene. Alternatively, a single camera that captures standard images may be used to create the concentric mosaics.

In one embodiment of the present invention, one concentric mosaic is created for each concentric circle defined within the "circle plane" of the 3D scene. In general, the system and process according to one embodiment of the present invention are designed to perform the following steps, as shown by the high-level flow diagram of FIG. 2:

a) generate a series of concentric mosaics each comprising a plurality of consecutive slit images that collectively depict the surrounding 3D scene (step 200); and b) render novel views of the 3D scene from viewpoints within the circular regions defined by the series of concentric mosaics using the slit images (step 202).

1.0 Generating Concentric Mosaics According to one Embodiment

Figure 3:
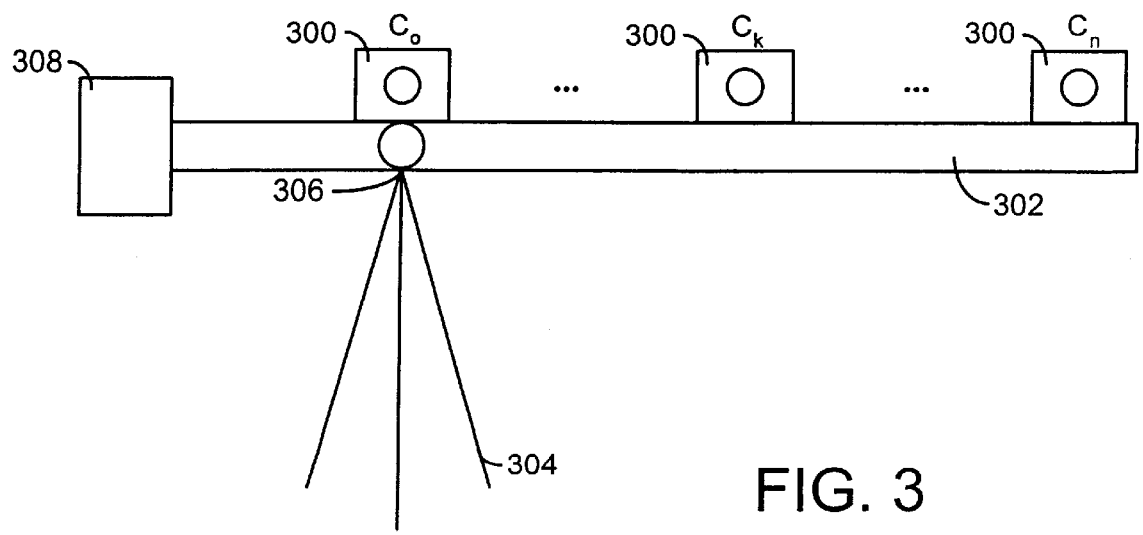
FIG. 3 is a diagram showing a side view of a simplified setup for capturing slit images of a real 3D scene using cameras.

Referring to FIG. 3, one technique for accomplishing the constrained camera motion needed to capture images of a real 3D scene is to mount several cameras 300 ($C_0$, $C_k$, $C_n$) on a rotating horizontal beam 302. While, only three cameras 300 are shown in FIG. 3, there would actually be many more positioned along the rotating beam. As will be discussed later, it is desirable to create as many concentric mosaics as possible—and so the need for many cameras or camera locations. The cameras 300 can be of any type appropriate for capturing images of the scene. Of course, since the images captured by the camera will be manipulated digitally (as will be described later), it would be convenient if digital cameras were employed to capture the images of the scene. However, more traditional cameras employing film or videotape could also be used, in which case the images would be digitized prior to being employed with the present invention. In the depicted case, the beam 302 is raised up from "ground level" by a support 304. This expands the vertical field of view and provides a more realistic perspective. Preferably the beam is raised high enough to ensure the full vertical field of view possible from the camera is realized. The interface between the support 304 and the beam 302 is configured to allow the beam to be rotated a full 360 degrees. Thus, this interface defines a center of rotation 306. A counterweight 308 is placed at the other end of the beam to counter balance the weight of the cameras 300. The plane defined by the circular region swept out by rotating the beam 360 degrees is the aforementioned circle plane (which in the depicted case is a horizontally oriented plane), and the circles traced out by each camera on the beam when the beam is rotated constitute the aforementioned concentric circles on the circle plane. It is also noted that in this embodiment, one of the cameras 300 is positioned at the center of rotation 306. The depicted multiple camera configuration is preferred as several of the concentric mosaics can be created simultaneously. However, it would also be feasible to use just one camera and move its radial location on the beam to create each concentric mosaic separately. In fact it is this latter set-up that was used in a tested embodiment of the present invention. Specifically, the set-up included a tripod with a rotatable mounting, a horizontally oriented beam, and a digital video camera.

The cameras 300 are so-called "slit" or "vertical line" cameras in that only the center lines of each image of the 3D scene captured is used. These images will hereinafter be referred to as "slit images". Preferably, the prescribed width of the slit images is as narrow as possible—ideally the width of a single pixel. Of course, the overall pixel size is variable, and while it is not preferred, the slit images could have a width of more than one pixel. In a tested embodiment of the present invention, it was preferred that each slit image exhibit a "horizontal" field of view not exceeding about 0.36 degrees, and ideally the "horizontal" field of view should be about 0.12 degrees. This would mean there would be between about 1000 and 3000 slit images making up each full revolution concentric mosaic. The aforementioned range was preferred because with more numerous, narrower slit images, the storage requirements would become onerous. Additionally, if fewer, wider slit images were used, the sampling rate would suffer as too much of the scene would be contained in each image. It is also noted that the use of the term "horizontal" field of view refers to the case where the circle plane is oriented horizontally in the 3D scene. Similarly, the previous reference to the height of the a slit image being dictated by the vertical field of view of the camera also assumes a horizontal circle plane. However, this need not be the case. The circle plane can actually have any orientation within the 3D scene. Thus, more generally, the measure of the height of a slit image can be referred to as its longitudinal field of view and the measure of the width of a slit image can be referred to as its lateral field of view. This terminology applies because the height of a slit image will typically be much greater than its width.

As mentioned previously, the slit images are captured periodically while the camera is rotated a full 360 degrees. The images are captured with a frequency, which given the prescribed width of the images and the speed of rotation, will produce images that when placed side-by-side in the order they were taken, form a concentric mosaic. Ideally, the camera motion is made continuous and at a uniform speed for the full 360 degrees of rotation. This will ensure the images will line up perfectly with no overlaps or gaps.

Figure 4A:
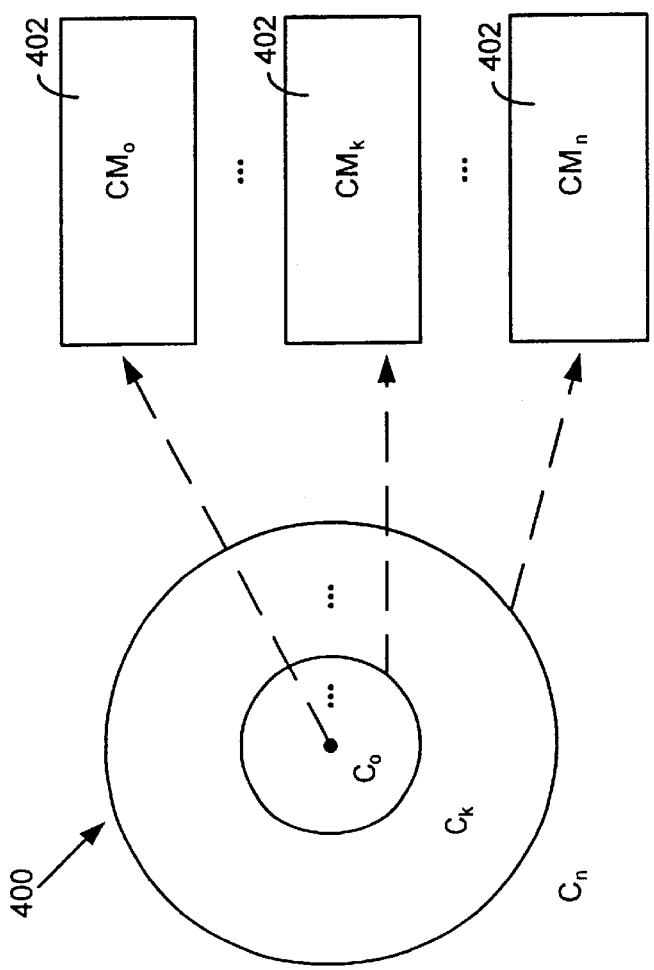
FIG. 4A is a diagram showing concentric circles on the circle plane and concentric mosaics associated with each circle.
Figure 4B:
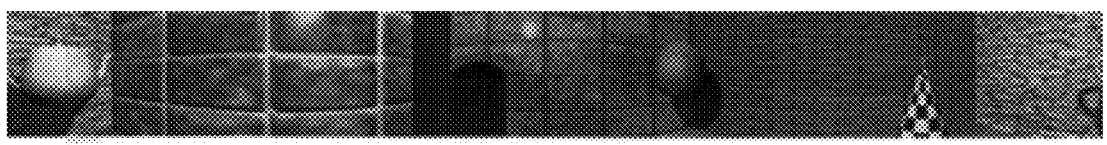
FIGS. 4B through 4D are images depicting concentric mosaics taken at three different radial locations (i.e., camera locations in this case).
Figure 4C:
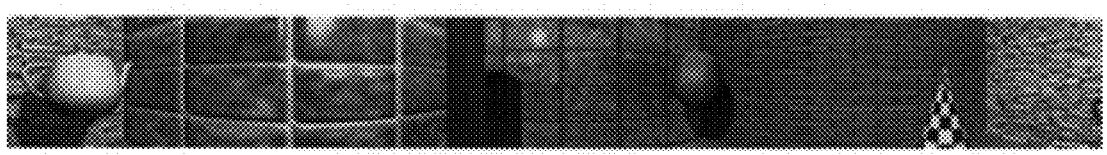
Figure 4D:
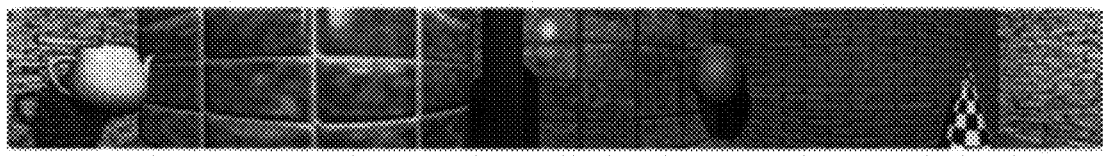

The process of creating a series of consecutive slit images that collectively depict the surrounding 3D scene is performed for each of the concentric circles 400 on the circle plane to form a collection of concentric mosaics 402, as shown in FIG. 4A. In the illustration of the process in FIG. 4A, the left hand side shows a series of concentric circles including the center of rotation $C_0$ (i.e., a circle with a radius of zero), one of the intermediate circles $C_k$, and finally an outermost circle $C_n$. Slit images are captured by moving a camera along each of the concentric circles and then combined in an side-by-side manner to form the concentric mosaics $CM_0$, $CM_k$, and $CM_n$, respectively. These concentric mosaics are illustrated in an "unwrapped" form by the rectangles 402 on the right hand side of FIG. 4A. Three examples of concentric mosaics created in accordance with these principals are provided in FIGS. 4B through 4D, respectively. FIG. 4B is from the center camera ($CM_0$), FIG. 4C is from the middle camera ($CM_k$), and FIG. 4D is from the outermost camera ($CM_n$). Notice that there is significant occlusion around the green cylinder across the sequence of mosaics. Also notice that the significant specular light change on the wall.

Figure 5:
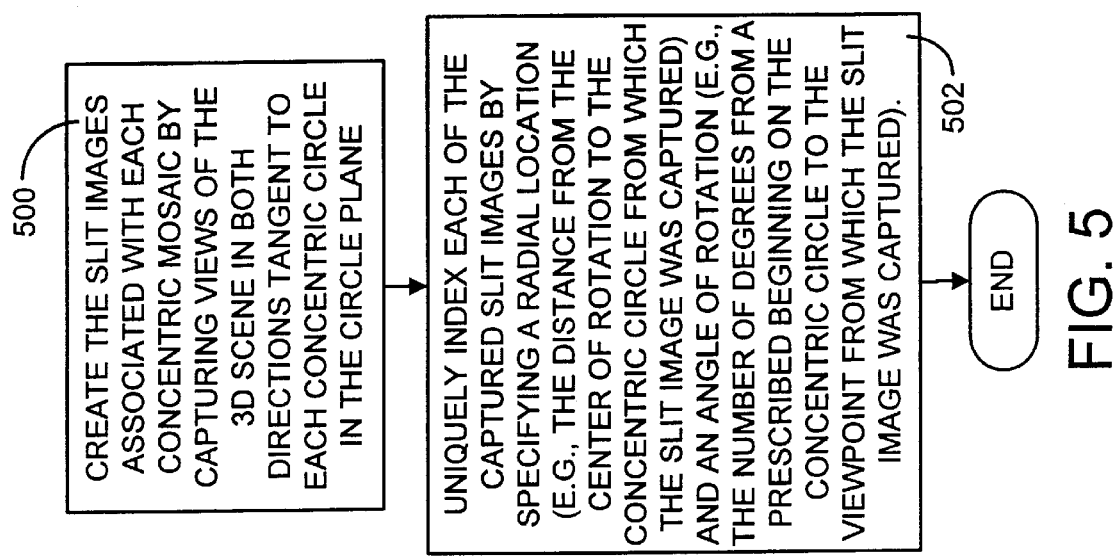
FIG. 5 is a flow chart diagramming a process for accomplishing the concentric mosaic creation module of the overall process of FIG. 2.
Figure 6A:
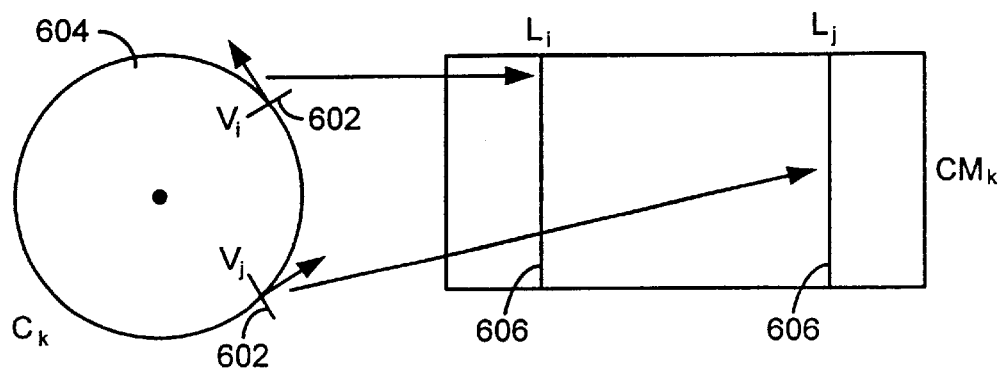
FIG. 6A is a diagram showing one of the concentric circles and the associated concentric mosaic, as well as the slit images captured at two viewpoints on the circle in a first tangential direction.
Figure 6B:
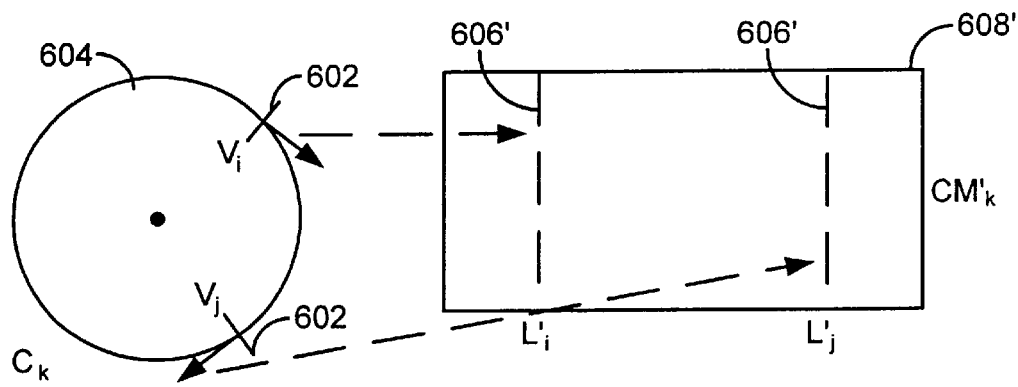
FIG. 6B is a diagram showing the concentric circle of FIG. 6A and a companion concentric mosaic, as well as slit images captured at the same two viewpoints on the circle, but in a second, opposite tangential direction.

More specifically, as outlined in the flow diagram of FIG. 5, each slit image is created by capturing the view of the 3D scene in directions tangent to one of the concentric circles in the circle plane (step 500). The geometry of this step is best seen in FIGS. 6A and 6B. In FIG. 6A, each slit image L (depicted as lines 600) is captured at a viewpoint v (identified by the short radial lines 602) on a concentric circle 604 in the circle plane, in a direction tangent to the circle. Referring once again to FIG. 5, the next step 502 in the process of creating a concentric mosaic is to uniquely identify each of the captured slit images. This is done by specifying a radial location (e.g., the distance from the center of rotation to the concentric circle from which the slit image was captured) and an angle of rotation (e.g., the number of degrees from a prescribed beginning on the concentric circle to the viewpoint from which the slit image was captured).

It is noted that FIG. 6A depicts capturing views of the 3D scene in only one of the directions tangent to a concentric circle 604 at each of its viewpoints 602. Ideally however, as shown in FIG. 6B, slit images are captured in the opposite tangential direction as well to create a companion concentric mosaic $CM_k'$ (depicted as rectangular region 608') for each of the concentric circles 604 on the circle plane. This will result in capturing the slit images 600, 600' needed to represent all the possible tangential viewing directions from each concentric circle—something that will be important for rendering of novel views, as will be discussed later in this description. The aforementioned companion concentric mosaic is created by capturing slit images L' (depicted as lines 600') at each viewpoint 602 in a direction opposite of the slit images L (i.e. 600 of FIG. 4A). Thus, step 500 of the flow diagram of FIG. 5 preferably includes capturing the view of the 3D scene in both directions tangent to the concentric circles in the circle plane. It is also noted that when the camera position is coincident with the center of rotation 306 (i.e. $CM_0$, $CM_0'$), the concentric mosaics are identical except for being shifted by 180 degrees.

Each slit image 600' is also uniquely identified in the same way as the slit images 600 associated the first tangential direction. Specifically, each slit image 600' is identified by a radial location and an angle of rotation. However, some designation must also be included to indicate that the slit image 600' views the 3D scene from a tangential direction on the specified concentric circle that is opposite from the slit images 600. For example, this can be done by adding an additional identifier like clockwise/counterclockwise to the indexing of all slit images.

Figure 8:
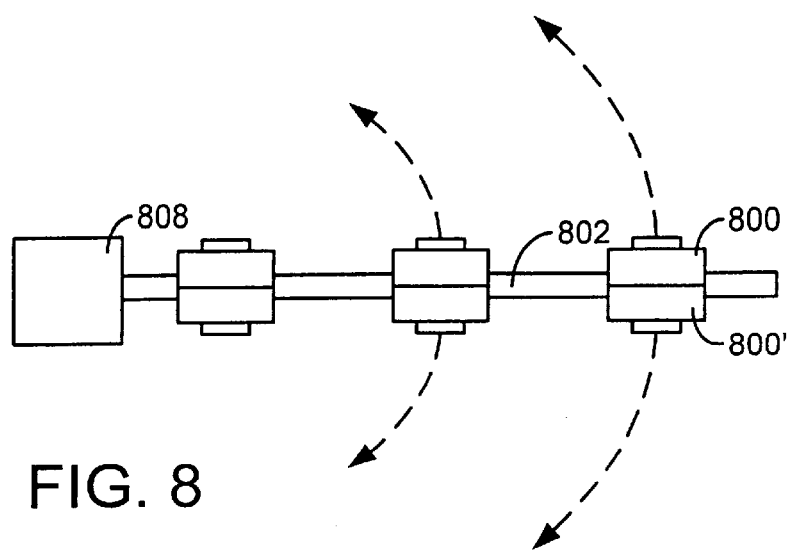
FIG. 8 is a diagram showing a top view of the simplified setup of FIG. 3 where back-to-back cameras are employed at every camera location on the rotating beam.

The oppositely-directed slit images at each viewpoint on a concentric circle are ideally captured by using two cameras 800, 800' placed back-to-back on the rotating beam 802 at each camera position, as shown in FIG. 8. The cameras 800, 800' are pointed in a direction that is tangent to the circle traced out by the cameras as the beam 802 rotates, but at the same time in a direction exactly opposite each other. It is noted that here again while only three sets of cameras and camera positions are depicted, there would actually be many more. Of course, alternately, a single pair of back-to-back cameras could be used, where the radial position of this pair is changed between each complete rotation of the beam to create the respective concentric mosaics. Or, a single camera could be used and reversed in direction at each camera position.

The slit images associated with a circle on the circle plane can be placed side-by-side in the order in which they were taken to produce the aforementioned concentric mosaics $CM_k$. Thus, the term "concentric mosaic" as used in the context of the description of the present invention refers to a collection of uniquely identified, stored slit images associates with one of the concentric circles on the circle plane of the 3D scene. These concentric mosaics are depicted as the rectangular region 608 in FIG. 6A and the rectangular region 608' in FIG. 6B. As will become apparent from the next section, the concentric mosaics are all that is needed to render a novel view the 3D scene from a viewpoint anywhere on the circle plane. It is noted that by capturing slit images to depict the entire 360 degrees view of the 3D scene from a concentric circle in both tangential directions, a plenoptic function can be formed at any point in the aforementioned circular region on the circle plane using the concentric mosaics. The concentric mosaics is a 3D plenoptic function, parameterized by three variables, namely the radius, angle of rotation and vertical field of view.

To this point, the process of creating concentric mosaics of a surrounding 3D scene has involved capturing images of a real scene using cameras. However, the present invention is not limited to generating the concentric mosaics from a real 3D scene. The concentric mosaics can also be generated synthetically using any appropriate graphics program capable of producing a 3D scene. Essentially, these programs can be employed to generate slit images of the desired dimensions, which depict a portion of a surrounding synthetic 3D scene, from a perspective that is tangent (in either direction) to a circle on a circle plane disposed within a synthetic 3D scene. Accordingly, in the description of rendering novel views from the concentric mosaics that is to follow in the next section, it should be understood that the captured slit images can refer to either real images or synthetic images.

2.0 Rendering of a Novel View

Once the slit images for a number of concentric mosaics have been captured, novel views of the 3D scene can be rendered because these images will represent all the possible slit images that would be needed to generate a novel view. A convenient way of envisioning this concept is to think of the novel view as being made up of a series of side-by-side slit images, each having the dimensions described previously. Each of these slit images of the 3D scene can be indexed by a ray traversing the circular region formed by the concentric mosaics, where the ray originates at the viewpoint of the novel view on the circle plane and extends along the plane toward the portion of the 3D scene associated with the slit image. Likewise, the location of a previously captured slit image can be indexed by a ray originating at its associated viewpoint on one of the concentric circles in the circle plane and extending towards the portion of the 3D scene captured by the slit image. For example, referring to FIGS. 6A and 6B, the rays 606, 606' refer to the location of the previously captured slit images associated with a viewpoint 602. These rays 606, 606' are directed tangentially (in opposite directions) from the concentric circle 604 as discussed previously.

If a sufficient number of concentric mosaics have been created, most of the rays (i.e., slit images) associated with a novel view will coincide with respective rays representing the location of the previously captured slit images. Slit images associated with those rays that do not coincide with a ray representing the location of one of the captured slit images can be interpolated from the captured images, as will be described later. Thus, referring to the flow diagram of FIG. 7, a novel view from a viewpoint inside the aforementioned circular region can be rendered by first identifying all the rays emanating from the viewpoint that represent the locations of the slit images needed to construct the novel view (step 700). Next, in step 702, it is determined if any ray associated with a previously captured slit image coincides with one of the rays representing the location of the slit images that are needed to form the novel view. This is accomplished by checking both radial location and rotation angle.

Figure 9:
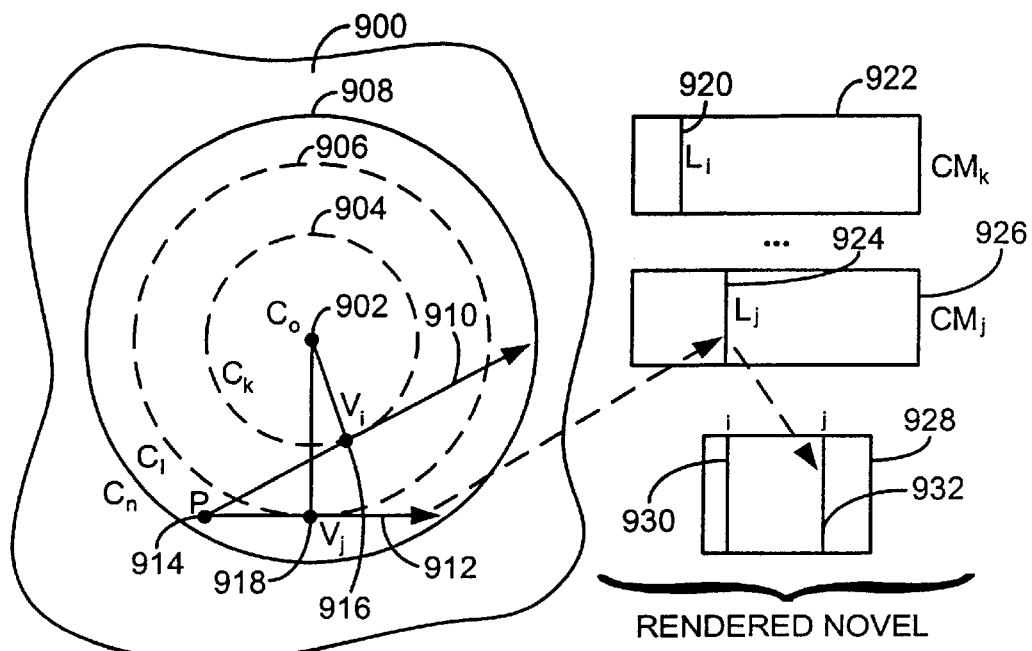
FIG. 9 is a diagram showing a series of concentric circles and the concentric mosaics associated with two of them, as well as rays associated with a novel view's viewpoint that coincide with rays associated with the concentric mosaics, thereby indicating the slit images identified by the rays can be used to construct a part of the novel view.

Any such coinciding ray will identify the associated previously captured slit image as one of the slit images needed to form a part of the novel view. As such, in step 704, the previously captured slit images associated with the coinciding rays are selected and associated with the appropriate ray emanating from the viewpoint of the novel view. Essentially, this last step involves associating the unique identifier for a slit image (i.e., its radial location and angle of rotation) with the appropriate ray emanating from the novel view's viewpoint. This process is illustrated schematically in FIG. 9. The left hand side of FIG. 9 shows the circle plane 900 with several of the concentric circles ($C_0$, $C_kC_l$, and $C_n$) 902, 904, 906, 908. In addition, the rays 910, 912 are shown emanating from viewpoint (P) 914 and respectively traversing the circle plane 900 toward two of the slit images needed to form the novel view. To render a novel view from viewpoint 914, the captured rays that coincide with rays 910, 912 need to be found. As all the captured slit images where taken in a direction tangent to one of the concentric circles, a coinciding captured ray can be found by determining where a ray emanating from viewpoint 914 becomes tangent with one of the concentric circles. In the depicted case, ray 910 is tangent to circle 904 at point ($v_i$) 916 and ray 912 becomes tangent to circle 906 at point ($v_j$) 918. Thus, the rays (not shown) that are associated with these points 916, 918, and have the same direction as rays 910, 912, identify the slit images needed to form part of the novel view.

Figure 10:
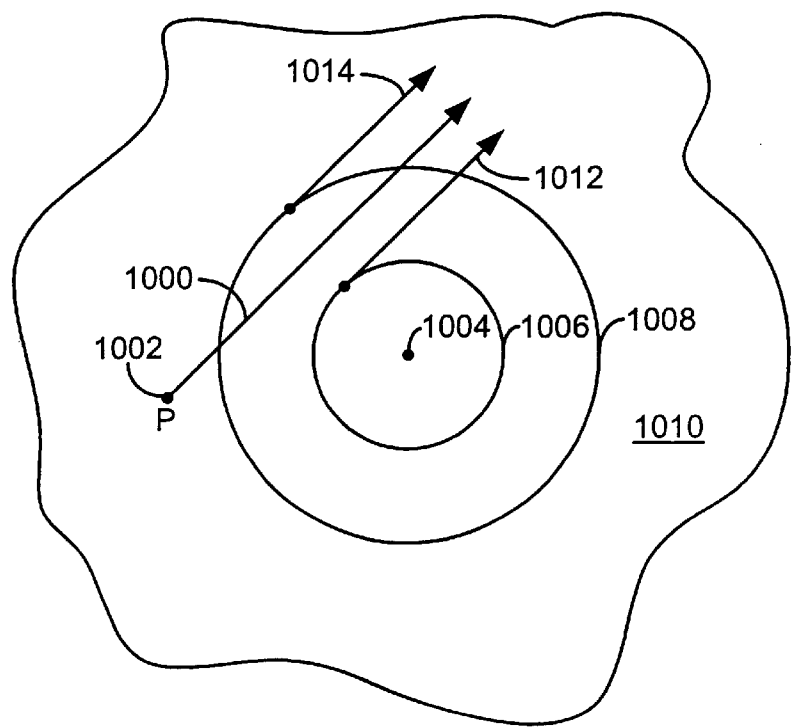
FIG. 10 is a diagram showing a series of concentric circles on the circle plane, and a ray associated with a novel view's viewpoint that does not coincide with any rays associated with the concentric mosaics.

There may be, however, practical limits to the number of concentric mosaics that can be created. For example, in the case of creating concentric mosaics of a real 3D scene, the optical characteristics of the camera(s) limits the number of distinct concentric mosaics that can be formed. A limitation on the number of concentric mosaics can have an impact on the rendering of novel views because some of the slit images needed to form a novel view may not exactly line up with one of the captured slit images. In other words, it is possible that a slit image needed to form a part of the novel view must contain portions of two adjacent captured views. Referring to FIG. 10, the foregoing situation can be illustrated as a ray 1000 emanating from a viewpoint 1002 associated with a novel view, which never becomes tangent to any of the concentric circles 1004, 1006, 1008 on the circle plane 1010. Instead the ray 1000 passes between two of the circles 1006, 1008. Therefore, no ray associated with a captured slit image will coincide with the ray 1000 (hereinafter referred to as a "non-coinciding ray"). One way of dealing with this situation is via a linear interpolation process. Linear interpolation involves blending two captured slit images to form the slit image required for the novel view being created. These slit images are blended in proportion to the proximity of their associated rays to the non-coinciding ray, as will be explained in detail below. Referring once again to FIG. 7, this is accomplished beginning with step 706 by identifying the two rays, which are parallel to a non-coinciding ray, and which respectively originate from viewpoints on the concentric circles of the circle plane lying on either side of the non-coinciding ray. This identification process can be accomplished by comparing radial locations.

The two rays paralleling the non-coinciding ray 1002 are shown in FIG. 10 as ray 1012 and ray 1014, respectively. Referring once again to FIG. 7, the next step 708 is to compute the distance separating the non-coinciding rays from each of their adjacent parallel rays. In step 710, a ratio is established for each slit image whose location is represented by one of the pairs of adjacent parallel rays based on the relative distance between parallel rays and the associated non-coinciding ray. This is accomplished via the following equations:

$$\text{ratio}=d_2/(d_1+d_2),$$

$$I_{1002}=\text{ratio}*I_{1012}+(1-\text{ratio})*I_{1014},$$

where $d_1$ is the distance between ray 1002 and ray 1014, and $d_2$ is the distance between ray 1002 and 1012. $I_{1002}$ is the pixel value (intensity) incurred by the ray 1002.

The computed ratio specifies the weight each the aforementioned slit images associated with a pair of adjacent parallel rays is to be given in the blending process to generate the interpolated slit image needed to construct the novel view. For example, referring to FIG. 10, if the ray 1000 identifying the needed slit image is halfway between the adjacent parallel rays 1012, 1014, then the aforementioned ratio for each of the slit images associated with the adjacent parallel rays would be 50 percent, and so each slit image would be given equal weight in the blending process. However, in a case where the non-coinciding ray is closer to one of the adjacent parallel rays than the other, the weight given each of the associated slit images would be different. For example, if one of the parallel rays was separated from the non-coinciding ray by one-third of the total distance between the two adjacent parallel rays, then the ratio computed for this situation would dictate that the slit image identified by the parallel ray closest to the non-coinciding ray be given a weight of about 66 percent. Likewise, the ratio would dictate that the slit image identified by the parallel ray furthest from the non-coinciding ray be given a weight of about 33 percent. Once the relative weights for each of the two slit images associated with the adjacent parallel rays has been established, the slit images are blended using any appropriate image blending technique, with the caveat that the contribution of each slit image to the combined image is scaled according to its computed weight factor (step 712). Thus, in the last example, blended slit image would constitute pixels having characteristics 66 percent attributable to the slit image associated with the closer of the two parallel rays and 33 percent attributable to the other slit image. Once blended, each newly interpolated slit image is associated with the applicable non-coinciding ray (step 714).

Figure 11:
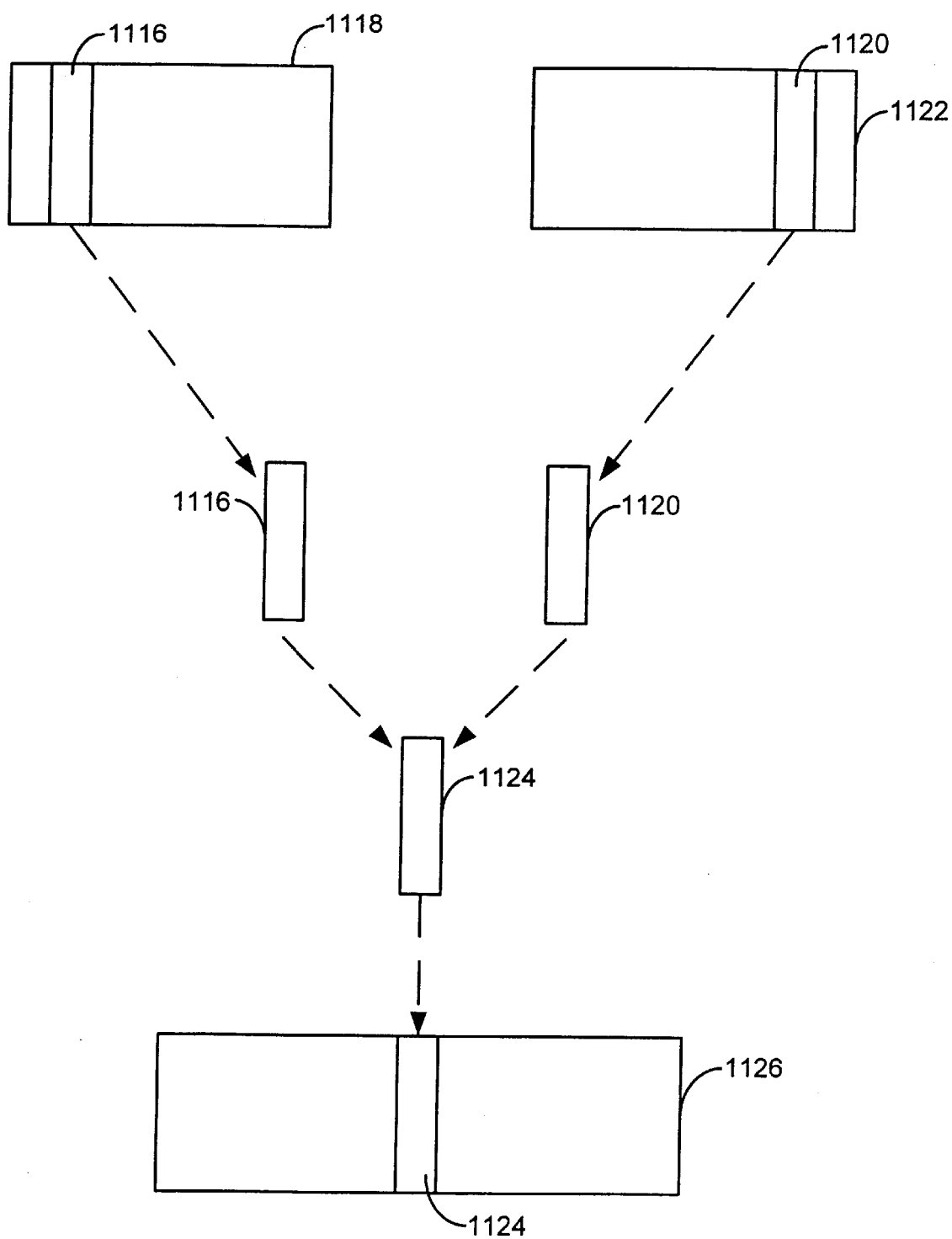
FIG. 11 is a diagram illustrating the sequence of events associated with creating an interpolated slit image from two previously captured slit images.

The foregoing interpolation process is illustrated graphically in FIG. 11. It is noted that to facilitate the description, the slit images in this figure have been depicted with exaggerated widths. The captured slit image 1116 associated with concentric matrix 1118 is selected as being one of the slit images identified by a pair of the aforementioned parallel rays (such as ray 1012 of FIG. 10). Similarly, the captured slit image 1120 associated with of concentric matrix 1122 is selected as being the other slit image identified by the pair of parallel rays (such as ray 1014 of FIG. 10). Next, the two slit images 1116, 1120 are blended, as dictated by their applicable ratios, to form an interpolated slit image 1124.

It is noted that in the above-described blending process, each longitudinally corresponding pixel in the two slit images being combined is blended together. Thus, for example, the top-most pixel of one slit image is blended with the corresponding top-most pixel of the other slit image, and so on. Further, in cases where the slit images are more than one pixel wide, each laterally corresponding pixel in the two slit images would be blended together. For example, the first occurring pixel in each row of pixels in the two slit images would be blended together, and so on. Depending on the blending process chosen, some additional blending between adjacent pixels in the combined image may also be performed to improve the quality of the interpolated slit image.

Figure 7:
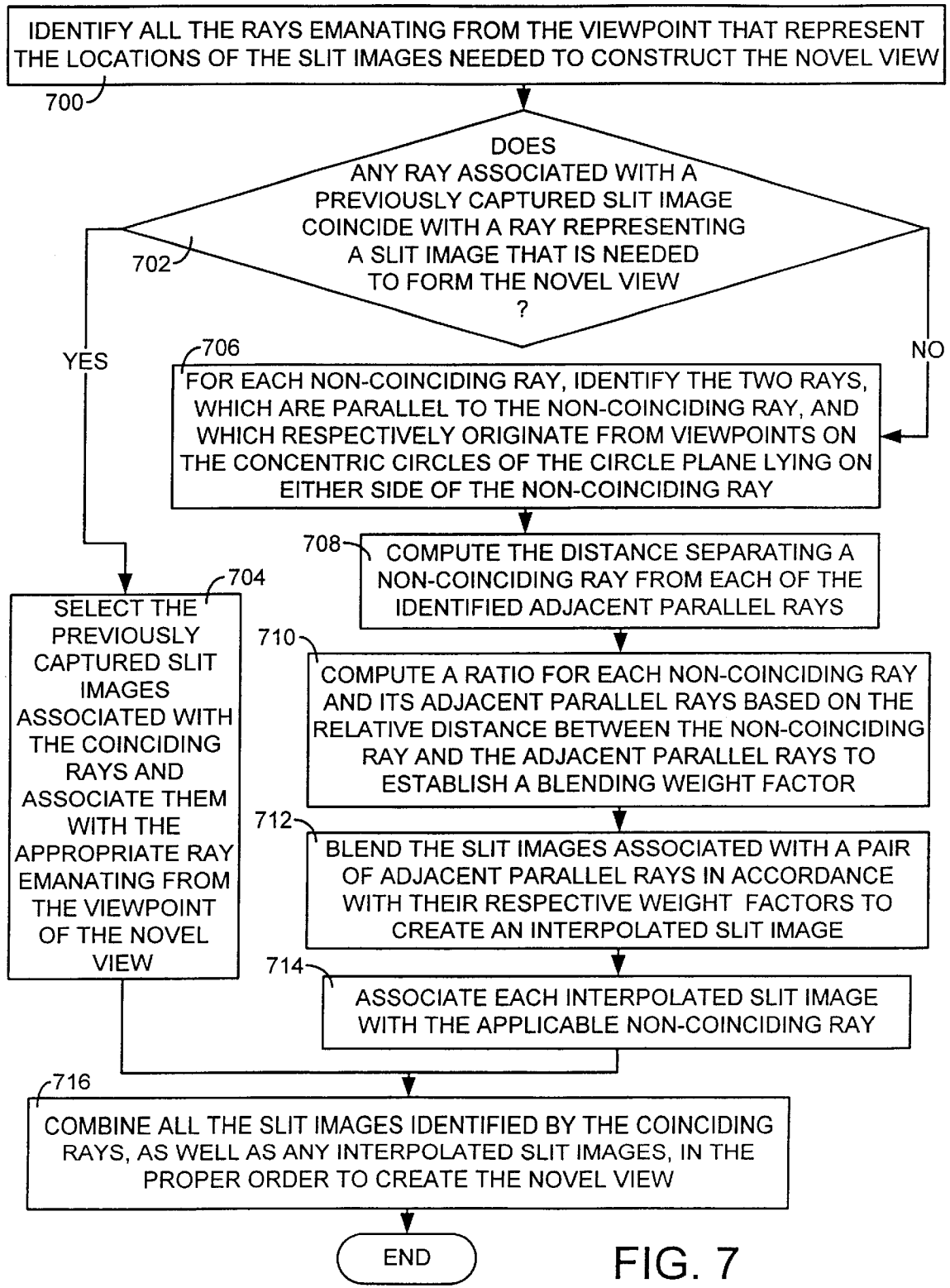
FIG. 7 is a flow chart diagramming a process for accomplishing the novel view rendering module of the overall process of FIG. 2.

Referring once more to the flow diagram of FIG. 7, the next step 716 in the process of rendering a novel view is to combine all the slit images identified by the coinciding rays, as well as any interpolated slit images, in the proper order to create the novel view. Referring to the right hand side of FIG. 9, the combining process is illustrated for the case where rays associated with captured slit images coincide with rays identifying slit images needed to construct the novel view. The slit image ($L_i$) 920 of the concentric matrix ($CM_k$) 922 is the slit image identified by the captured ray associated with point ($v_i$) 916. Similarly, the slit image ($L_j$) 924 of the concentric matrix ($CM_l$) 926 is the slit image identified by the captured ray associated with point ($v_j$) 918. Therefore, these slit images 920, 924 can be used to construct part of the novel view 928. Specifically, slit image (i) 930 and slit image (j) 932 are placed in the appropriate location in the novel view being rendered. In the case where the previously described linear interpolation process is required to produce a slit image for the novel view from adjacent captured slit images, the slit image placement step would be performed after the interpolated slit image is constructed. This is illustrated at the bottom of FIG. 11 where the interpolated slit image 1124 is placed in the appropriate location in the novel view 1126. Using the foregoing procedures, all the remaining slit images needed to construct the novel view would be selected from the captured slit images and placed in the proper position— either directly or after undergoing interpolation. The order in which the slit images are placed to form the novel view is the same as the order of the rays established as emanating from the viewpoint of the novel view. In this way, a novel view can be constructed having an overall lateral field of view of from that provided by one slit image, up to a full 360 degree view of the 3D scene from the viewpoint associated with the novel view.

It is noted that while a novel view rendered in accordance with the foregoing process can have a wide range of possible lateral fields of view, its longitudinal field of view (or height) is more limited. Essentially, the maximum longitudinal field of view of a novel view will be limited to that of the camera(s) that was used to capture the original slit images making up the concentric mosaics.

For synthetic environments, we have used a renderer, 3D Studio Max, to render slit images at different concentric circles. These slit images are then put together to construct concentric mosaics. With the help of a z-buffer plug-in, we are also able to obtain a depth value for each pixel.

We sample concentric mosaics in both radial and angular directions to ensure that the user moves uniformly inside a unit circle. It is fair to sample uniformly the angular direction (e.g., every tenth of a degree). But in the radial direction, the sampled circles at locations $\{0, \sqrt{1/n}, \sqrt{2/n}, \ldots, 1\}$ instead of at locations $\{0, 1/n, 2/n, \ldots, 1\}$, because the median circle dividing the unit circle into two halves is not at ½ but at $\sqrt{1/2}$.

In a typical novel view with 36 degrees horizontal FOV and 200 width range, 2000 samples in the angular direction are needed. The more samples taken in the radial direction, the less interpolation is required (therefore better rendering results). Typically we sample 20 concentric circles in 3000 angular directions, i.e., 20 concentric mosaics with a width of 3000. The width of each slit image is determined according to its horizontal field of view (e.g., 0.12 degree for 3000 samples at each circle).

3.0 Depth Correction

Figure 12A:
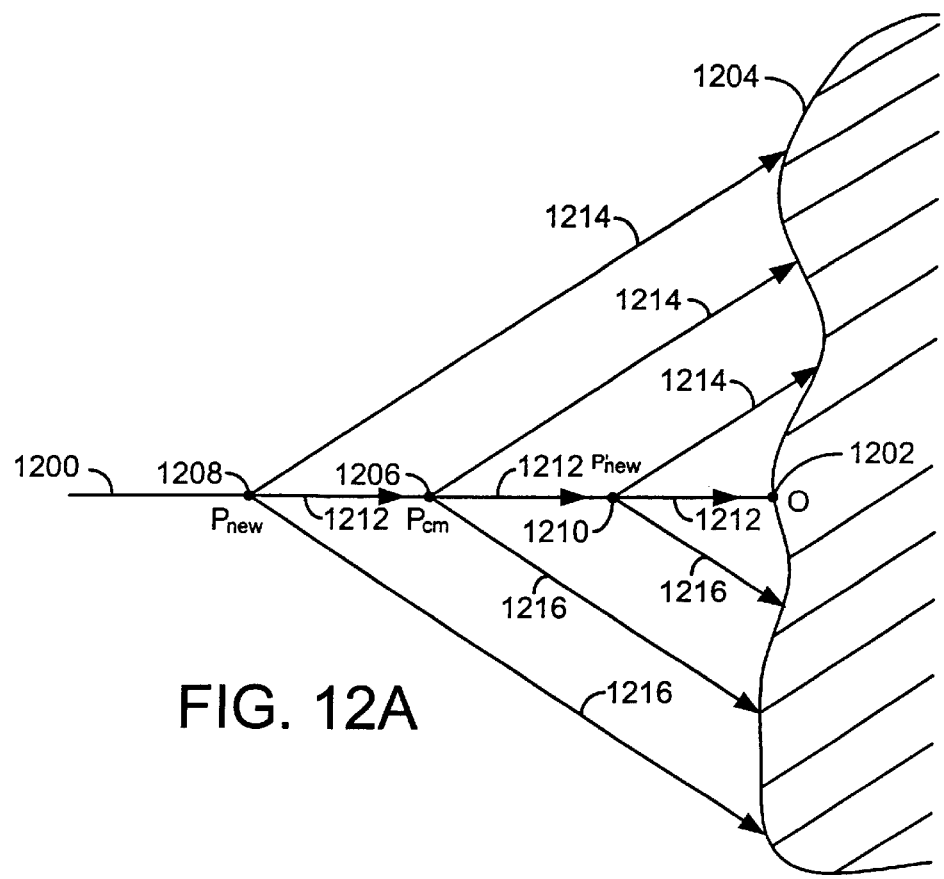
FIG. 12A is a diagram showing a side view of the circle plane with rays emanating from three viewpoints toward an object in the 3D scene to illustrate the depth distortion that can occur in a rendered novel view if objects in the novel view are too close to the various viewpoints.
Figure 12B:
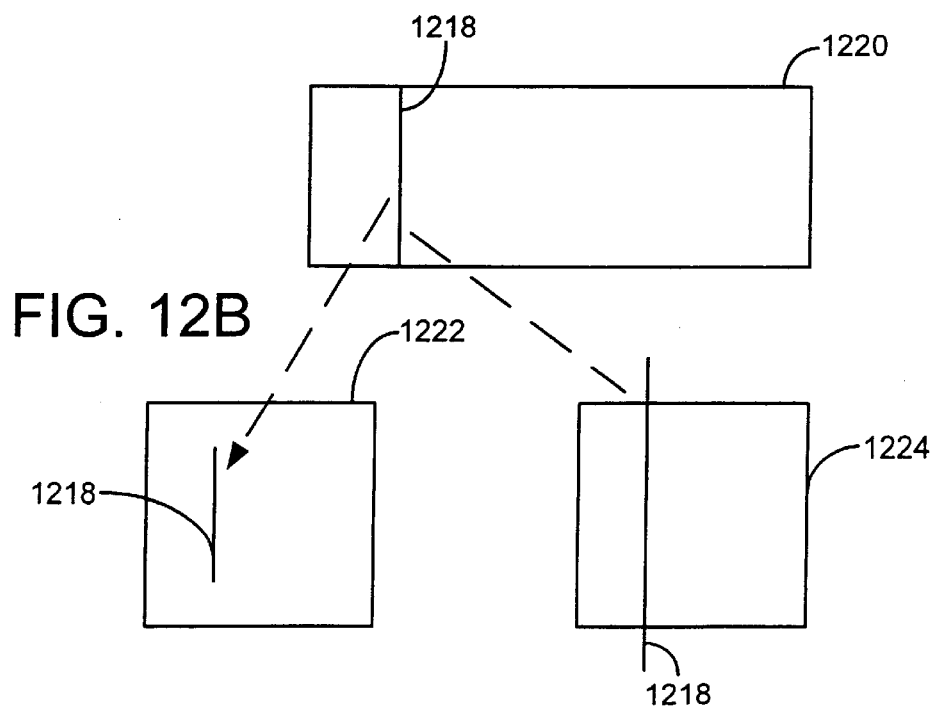
FIG. 12B is a diagram illustrating the problem with rendering novel views using a previously captured slit images from viewpoints in back of and in front of the viewpoint of the captured view, when an object depicted in the novel view is too close to the various viewpoints, as shown in FIG. 12A.

In the foregoing description, slit images were captured from viewpoints lying on concentric circles in the circle plane and from a perspective directed along the plane. This produces slit images that are longitudinally centered about the circle plane. The novel views were then constructed from these slit images. However, it should be pointed out that the slit images used to construct novel views were not captured at the novel view's viewpoint. If the objects associated with the 3D scene are all distant, then the separation between the aforementioned viewpoints would not matter, and the rendered view would be accurate. However, if there are objects in the 3D scene that are close, the resulting rendered view could exhibit depth distortions in pixel locations lying above and below the center of the height of the novel view. The reason for this potential distortion can be best explained in reference to FIGS. 12A and 12B. FIG. 12A depicts a side view of the circle plane 1200 and a point (O) 1202 where the plane would intersect an object 1204 in the 3D scene. Three viewpoints ($P_{CM}, P_{new}, P'_{new}$) 1206, 1208, 1210 are depicted on the circle plane 1200, each of which has three rays 1212, 1214, 1216 directed outward therefrom. One of the rays 1212 associated with each viewpoint is directed along the circle plane 1200. Another ray 1214 is directed above the plane 1200, and the third ray 1216 is directed below the plane. Suppose that the rays 1214 directed above the circle plane 1200 represent the direction to a top-most pixel (or a row of pixels) in a slit image capturing a portion of the object 1204, and that the rays 1216 directed below the circle plane represent the direction to a bottom-most pixel (or a row of pixels) in the slit image. In each case the angle separating the upward directed rays 1214 from the downward directed rays 1216 represents the longitudinal (vertical in this case) field of view associated with the system used to capture the slit images. This angle would be the same at each viewpoint 1206, 1208, 1210. Further, referring now to both FIGS. 12A and 12B, suppose that the center viewpoint 1206 corresponds with the viewpoint of one of the previously captured slit images 1218 in one of the concentric mosaics 1220, and that the viewpoints 1208, 1210 on either side of the center viewpoint correspond to the viewpoints for two different novel views 1222, 1224. As can be seen in FIG. 12A, while the rays 1212 from each viewpoint along the plane all "view" the same point 1202 on the object 1204, this is not true for the rays 1214, 1216 directed above or below the plane 1200. This results in the aforementioned distortion in novel views of objects that are close to the respective viewpoints 1206, 1208, 1210. The net result of this problem can be seen in FIG. 12B, where the slit image 1218 captured from the center viewpoint 1206, would be too short for constructing a novel view 1222 which has a viewpoint 1208 behind the center viewpoint in relation to the object 1204— noting that the heights of the captured slit image 1218 and the novel views 1222,1224 correspond to their respective longitudinal fields of view at the face of the object. Additionally, the slit image 1218 would be too long for use in constructing the novel view 1224 which has a viewpoint 1210 lying in front of the center viewpoint 1206 in relation to the object 1204.

Figure 13:
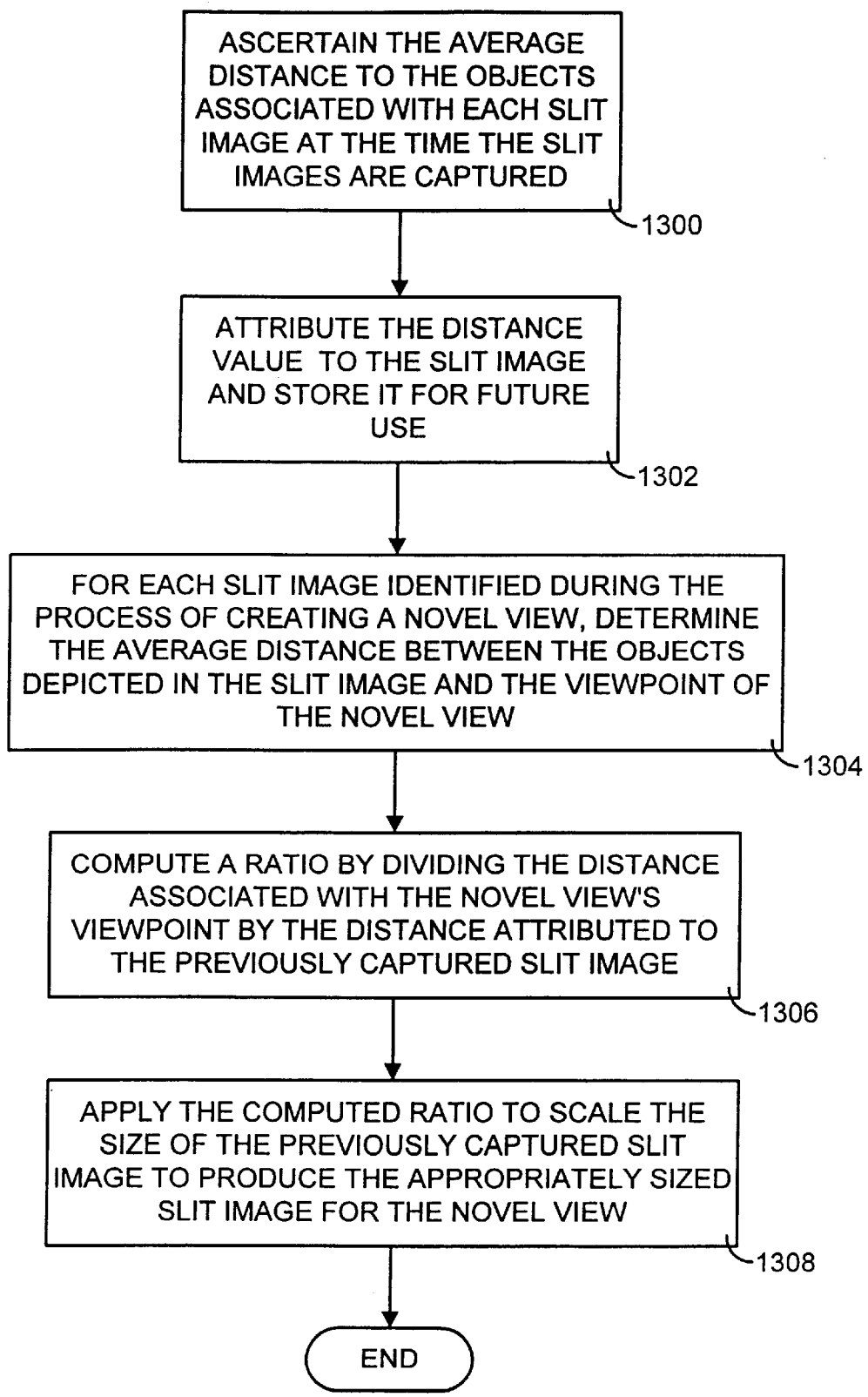
FIG. 13 is a flow chart diagramming a process for compensating for the depth distortion depicted in FIGS. 12A and 12B.

One way of compensating for the aforementioned distortion would be to use a simple scaling process. Referring to the flow diagram of FIG. 13, this scaling process would preferably begin with the step 1300 of ascertaining the average distance to the objects associated with a slit image. This distance is known for the synthetic scene, or can be recovered using conventionally computer vision algorithms for the real scene. In step 1302, this ascertained distance value would be attributed to the slit image and stored for future use. When a novel view is to be created, the process described previously is performed to the point where a slit image of a concentric mosaic is identified for use in constructing the novel view. In step 1304, for each such slit image identified, the average distance between the objects of the 3D scene depicted in the slit image and the viewpoint of the novel view is determined. A ratio is then computed in step 1306 by dividing the distance associated with the captured slit image by the distance associated with the novel view's viewpoint. This ratio is then applied to scale the height of the captured slit image to produce an appropriately sized slit image for the novel view (step 1308). The remainder of the rendering process is the same as that previously described for the construction of novel views.

4.0 An Additional Rendering Technique

Figure 14A:
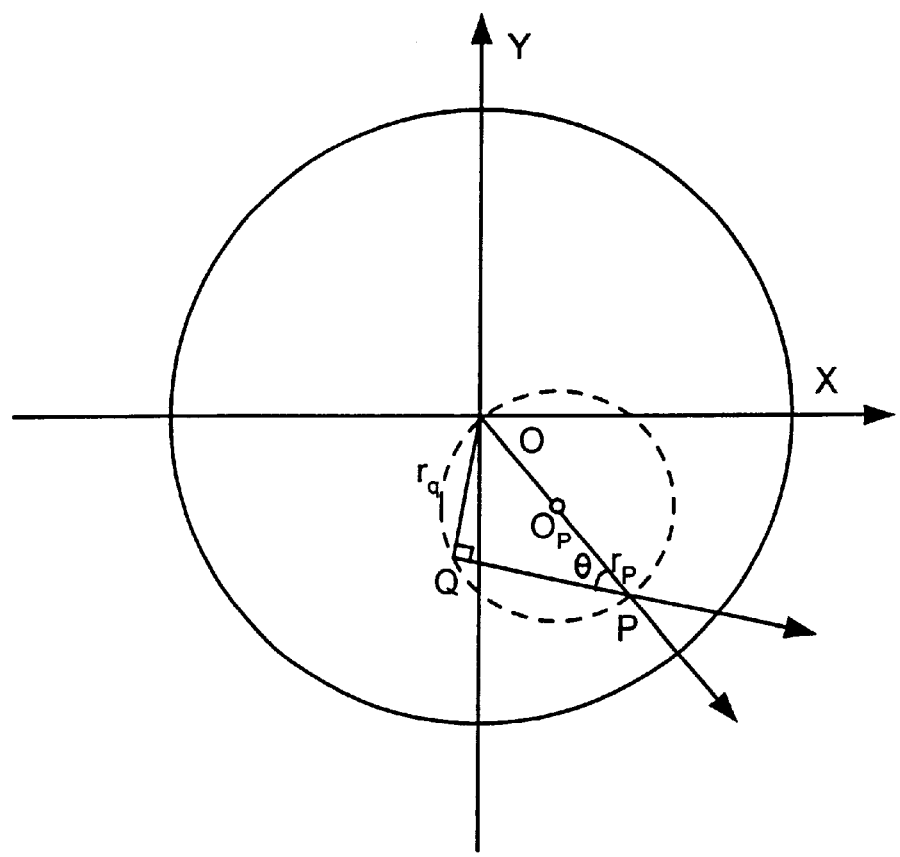
FIGS. 14A and 14B are diagrams showing how to render an image using concentric mosaics.

FIGS. 14A and B illustrate a particular technique for rendering using concentric mosaics. Given the center of concentric mosaics O, a viewpoint P, and its viewing direction θ, the point Q on the concentric mosaic can be determined.

The polar coordinates $(r_p, \theta_p)$ of the viewpoint P are defined as $$r_p = \sqrt{(P_x - O_x)^2 + (P_y - O_y)^2}$$

$$\theta_p = \operatorname{atan2}(P_y - O_y, P_x - O_x).$$

Figure 14B:
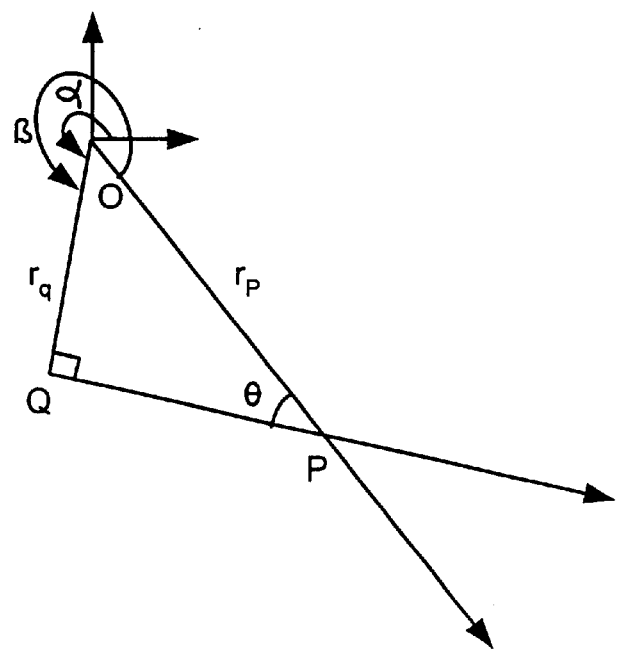

The polar coordinates $(r_q, \beta)$ of the point Q become $$r_q = r_p |\sin(\theta)|$$

$$\beta = \theta + \theta_p - \pi/2$$

where $\alpha = \theta - \pi/2$ and $\alpha - \beta = -\theta_p$ (See FIG. 14B).

It is apparent that as θ increases from 0 to 180 degrees, the trajectory of Q is a circle centered at the middle of OP ($O_p$ in FIG. 14) and going through O and P. Indeed, $$Q_x - O_{px} = \frac{-r_p}{2}\cos(2\theta + \theta_p)$$

$$Q_y - O_{py} = \frac{-r_p}{2}\sin(2\theta + \theta_p)$$

5.0 Capturing Concentric Mosaics for a Real Scene

Figure 15:
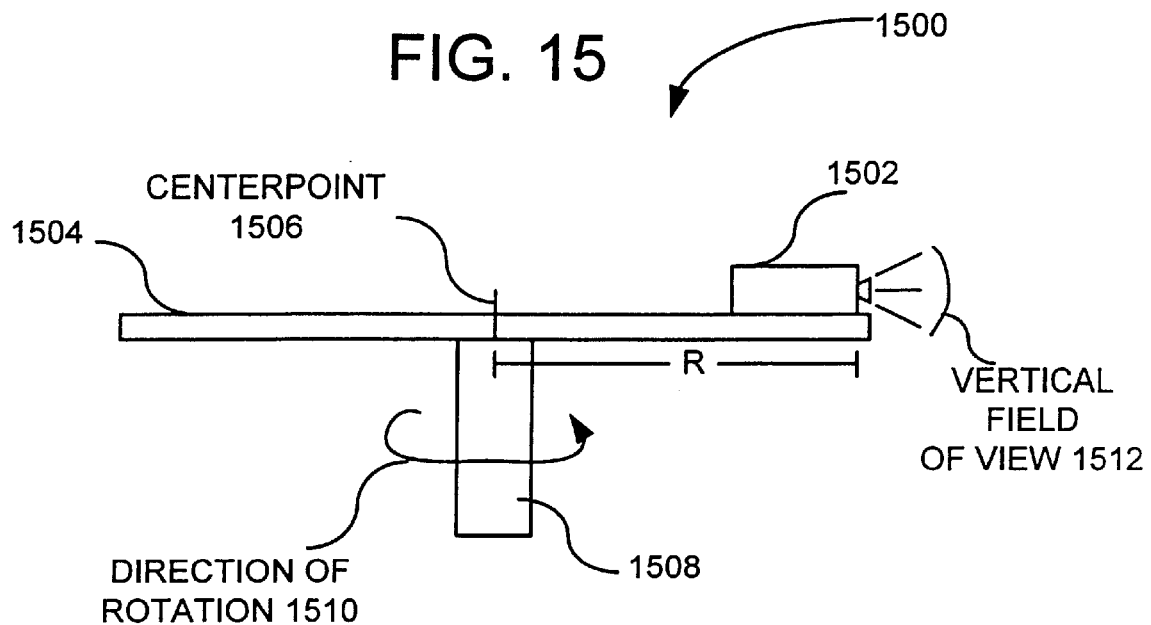
FIG. 15 is a side elevational view of another embodiment of the present invention wherein a single camera is mounted to a rotating table to capture a real scene.

FIG. 15 shows another embodiment of the invention that is particularly useful for capturing concentric mosaics for real scenes. The system 1500 uses a single off-centered camera 1502 that moves along a circular path in a plane. In particular, the camera is mounted to a table 1504 that rotates the camera 1502 at a radius R about a center point 1506 (R is measured from the center point to the camera's focal point). A suitable motor 1508 or other means may be used to rotate the table. An example rotary table is a Parker 5" table and Parker 6104 Indexdrive controller. As indicated by arrow 1510 the table is rotated in a clockwise direction at a constant speed, but may also be rotated in counterclockwise direction if desired. If the rotation is not precisely controlled, vision techniques such as camera calibration and motion estimation can be used to recover the rotation parameters. It is desirable to rotate the table slowly so as to obtain enough samples along the angular direction and to avoid motion blur. An example of a full circle motion is about 90 seconds with 1351 frames recorded. As shown at 1512, the camera 1502 has a constant vertical field of view. In the illustrated embodiment, a standard video camera is used to capture images. For example, a Sony Mini DV digital video camera may be used. However, other types of cameras may also be used if desired. For example, a standard, single lens camera (not shown) taking constant pictures may be used. Such a camera provides the same result as the video camera in that a sequence of images is captured as the camera rotates around the center point. Another possibility is to have multiple cameras (not shown) mounted around the periphery of the circular table. These multiple cameras simultaneously activate so that an instantaneous image of the entire scene is captured. When multiple cameras are used, it is unnecessary for the table to rotate. For purposes of illustration, only the video camera embodiment is described hereinafter.

Figure 16:
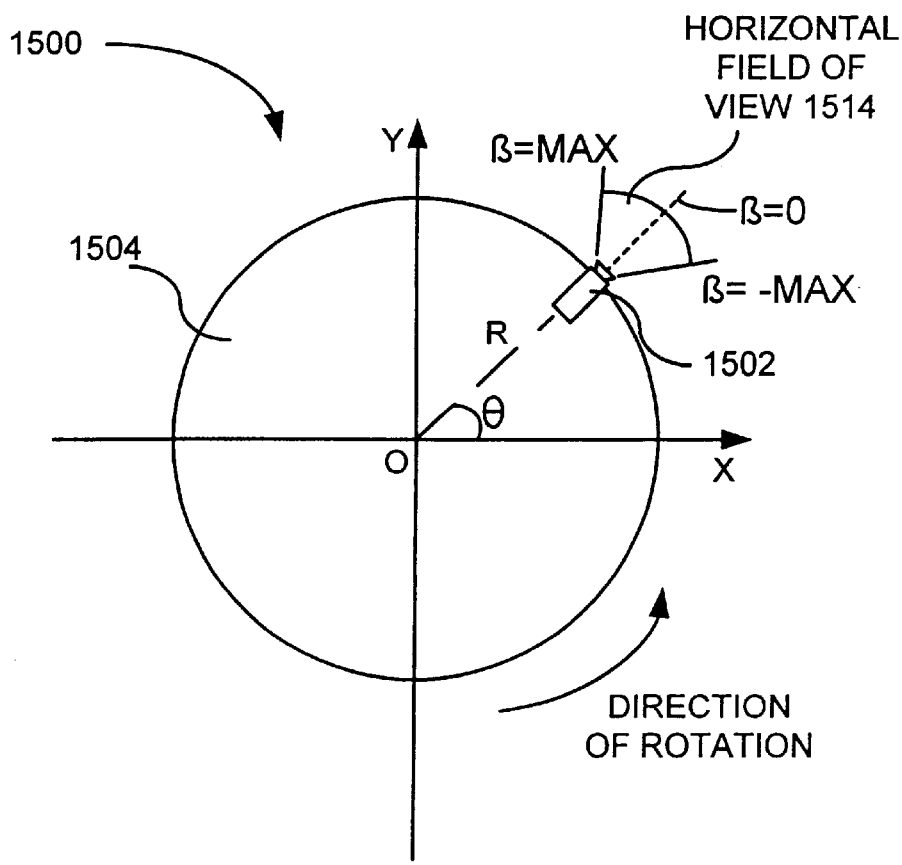
FIG. 16 shows a top view of the camera and rotating table of FIG. 15.

FIG. 16 shows a top view of the system 1500. The camera 1502 moves along a circular path defined by the focal point of the camera and has its viewing direction positioned perpendicular to the circular path. As indicated at 1514, the camera 1502 has a constant horizontal field of view. Light rays enter the camera 1502 at different angles or ray directions. For purposes of illustration, a light ray farthest to the right of the camera's horizontal field of view is designated as angle $\beta = -\text{MAX}$. Similarly, a light ray entering on the farthest left side of the horizontal field of view 1514 has a ray direction designated as $\beta = \text{MAX}$, wherein the values of $\beta = \text{MAX}$ and $\beta = -\text{MAX}$ are a function of the camera used. Centrally located in the horizontal field of view is the camera viewing direction designated as $\beta = 0$. As the camera 1502 rotates along the circular path, its position can be defined by an angle θ. This angle θ can be calculated using the speed of the rotating table 1504 and the amount of time that the camera 1502 has been rotating from a known point, such as where the camera crosses the x-axis.

Figure 17:
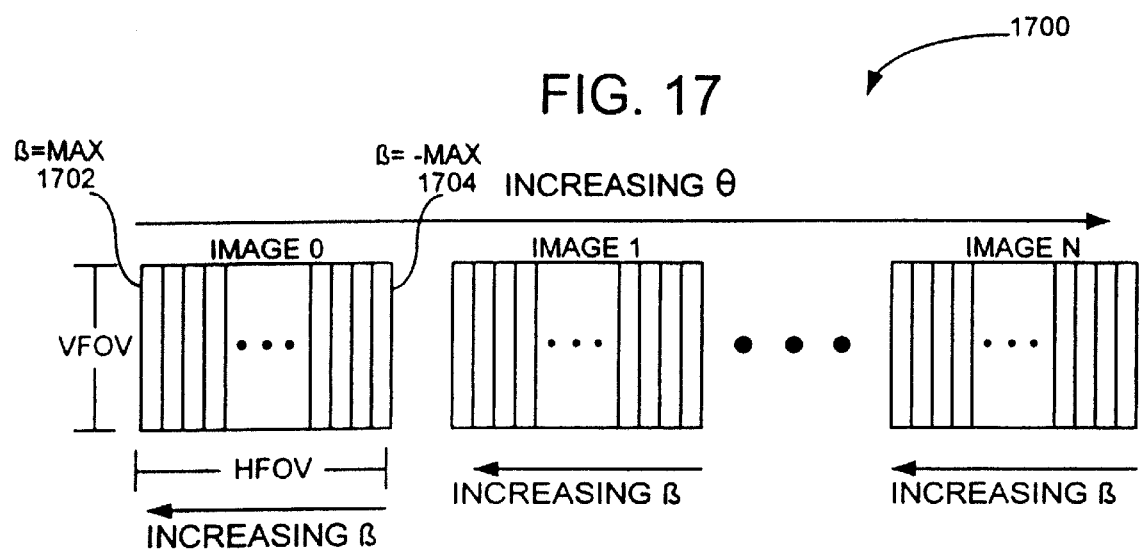
FIG. 17 is a diagram illustrating a sequence of images captured by the camera of FIG. 15.

FIG. 17 shows the image data 1700 captured by the camera 1502. The sequence of images are numbered such that image 0 is the first image captured at a predetermined starting point. For example, image 0 may be the image captured when the camera 1502 crosses the x-axis of FIG. 16. The images are formed by a plurality of vertically aligned, discrete image lines, such as image line 1702, that have a height corresponding to the vertical field of view (VFOV) 1512 (FIG. 15). Each image line has a different ray direction or angle β associated with it. For example, the left-most image line 1702 in image 0 corresponds to β=MAX whereas the right-most line 1704 corresponds to β=−MAX. For any particular value of β there are a plurality of pixels extending for the vertical field of view. For purposes of illustration, the vertical field of view is described as being 240 pixels in height. Thus, each value of β has 240 pixels associated therewith. In the illustrated embodiment, 320 image lines are used to form the image, which corresponds to an image that is 320 pixels wide. The particular pixel values used for the vertical field of view and a number of image lines varies depending on the application and any desired number may be used. Typically, increasing the number of pixels increases the resolution of the image. Additionally, the number of images captured by the camera as it moves through 360 degrees can vary. In the illustrated embodiment approximately 1300 frames were used to capture the scene through 360 degrees of rotation. In general, the more frames that are used, the more accurate an image displayed from a novel viewpoint. However, more frames require more storage and more time to render new images. The number of frames used depends on the particular application. Additionally, although in the illustrated embodiment, the value of β increases from right to left, it alternatively may increase from left to right. The input video sequences may be compressed well because of the significant spatial adjacency between frames. A standard MPEG4 codec to the video sequences has been used. A very high compression ratio can be obtained but selectively decoding the compressed bit stream (depending on the viewing direction) is difficult because of the inter-frame and intra-frame dependency. Vector quantization is a good choice for selective decoding (as demonstrated in the lightfield compression [LH96]), but it is believed that higher compression ratio can be achieved with motion compensated compression techniques.

Figure 18:
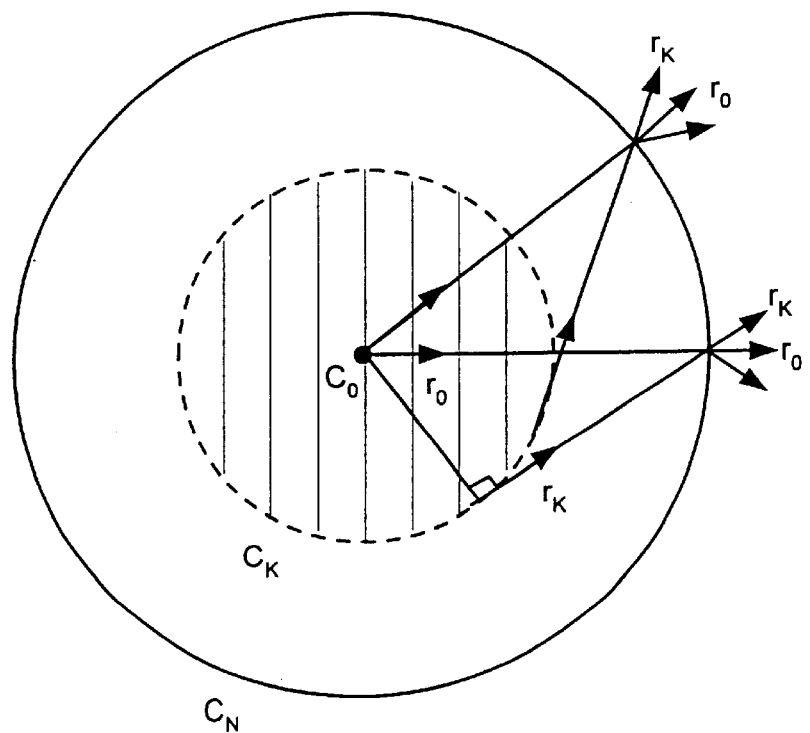
FIG. 18 is a diagram showing the construction of a concentric mosaic using the camera of FIG. 15, wherein the camera is mounted in a normal direction.

FIG. 18 illustrates how the captured images may be used to form concentric mosaics. The outer circle, $C_N$ represents the circle that the camera 1502 rotates on. As shown in FIG. 18, no matter at which point along the circle $C_N$ the camera is located, the same indexed ray on the plane, such as ray $R_k$(which has a corresponding value of β), is always tangent to the same circle $C_K$. Thus, a concentric mosaic at $C_K$ may be formed by combining the same vertical image lines 1 taken at different rotation angles θ. Other concentric mosaics may be formed by using different values of β. It should be recognized, however, that for each concentric mosaic there is a positive value of β and a negative value of β that correspond to the same concentric mosaic (e.g., β=20 and β=−20). Thus, a sequence at M regular images taken along a circle with size H×(2W−1) (where H is height and W is width) can be rebinned into W concentric mosaics. Once the desired concentric mosaics are formed, the techniques described above in relation to the slit image cameras may be used to render images. However, as further described below, the rebinning process can be skipped to avoid double sampling. When using concentric mosaics, the concentric mosaics representation is a plenoptic function parameterized by three variables: rotation angle, radius (distance of camera to rotation axis), and vertical field of view.

FIG. 18 illustrates that although actual images were captured on the circle $C_N$, the system can display images from any novel viewpoint within the hatched circle $C_K$ (assuming $r_K=B_{MAX}$), despite that no actual images are taken within that circle. Much less data needs to be stored using this technique since only the set of images taken along the circle $C_N$ is stored while a variety of different viewpoints can be rendered. Thus, a user can move freely in a circular region to observe motion parallax and lighting changes of objects in the scene.

Figure 19:
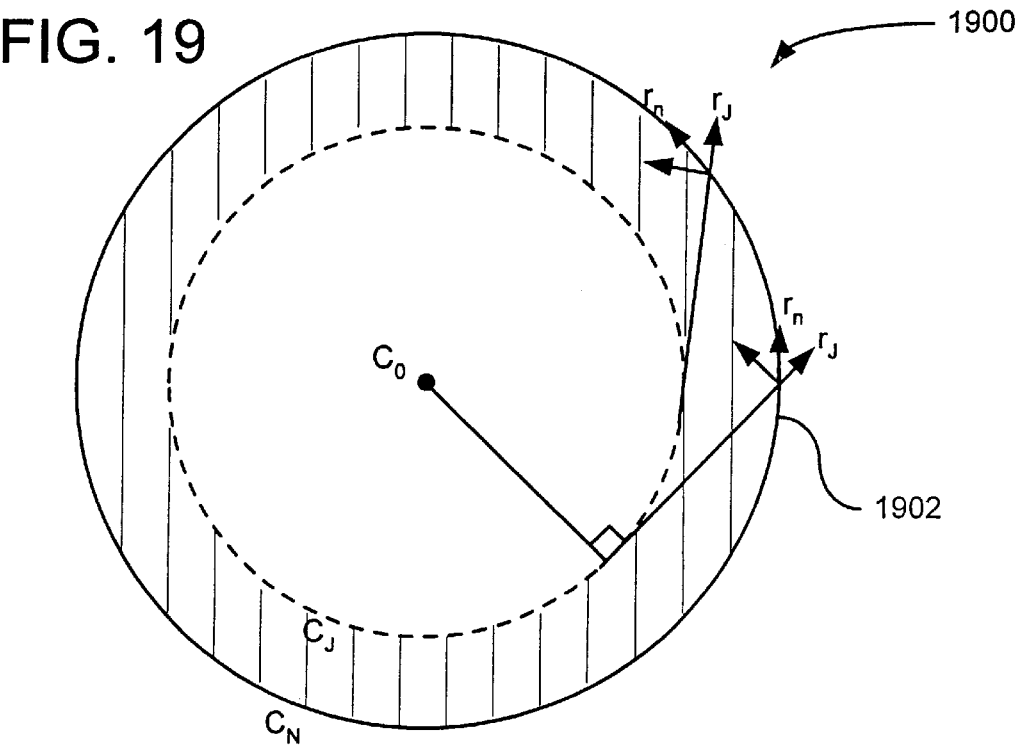
FIG. 19 is a diagram showing the construction of a concentric mosaic using a camera similar to the camera of FIG. 15 wherein the camera is mounted in a tangential direction.

FIG. 19 shows another possible setup 1900 that may be used for capturing the image data and forming concentric mosaics. Specifically the camera 1502 may be placed along a tangential direction to the circular path 1902, instead of the normal direction previously shown. Using the tangential setup the outer hatched area between $C_J$ and $C_N$ is covered so that any novel viewpoint within this area can be rendered.

Because vertical lines in an input image have different horizontal FOVs, they may have to be resampled to ensure uniform sampling. This resampling process becomes more significant when the camera's horizontal FOV is large. The average distance between the novel view and the captured view is much larger if one circle is used rather than if multiple circles are taken. Longer distance causes bigger depth distortion. This illustrates a difference between 3D concentric mosaics and a 4D lumigraph: for concentric mosaics, not only do we want to find the captured ray on the plane, but we also want to find the ray as closest to the novel view as possible. Another possible capturing device is to use a few regular cameras, aligned as shown in FIG. 3, with the tangential setup as shown in FIG. 19.

FIGS. 21, 22, 23 and 24 illustrate a method for displaying an image from a novel viewpoint. A novel viewpoint is a viewpoint that was not originally captured by the camera 1502, but nonetheless can be rendered using the techniques described herein. In a first step 2100 (FIG. 21), a sequence of images is provided wherein each image has image data associated with ray directions. Thus, for example, returning briefly to the sequence of images of FIG. 17, the image data is shown as the image lines, such as image line 1702, that has an angle β corresponding to a ray direction. Although the image data is shown as an image line having multiple pixels with the same ray direction other image data may be used, such as individual pixels.

Figure 22:
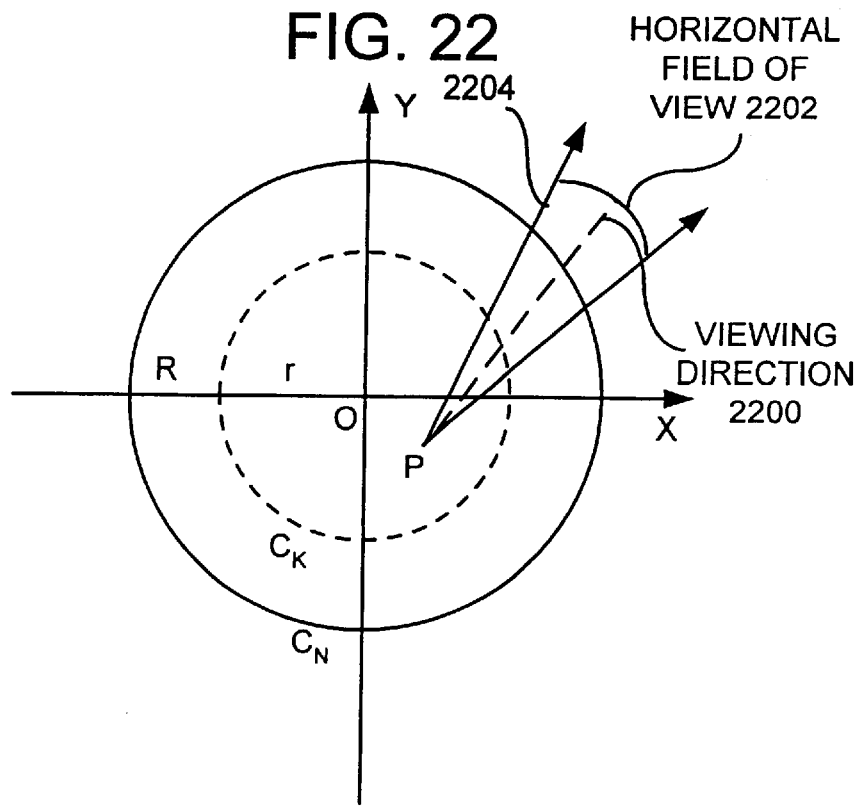
FIG. 22 is a diagram illustrating a novel viewpoint and a viewing direction obtained from user input.
Figure 23:
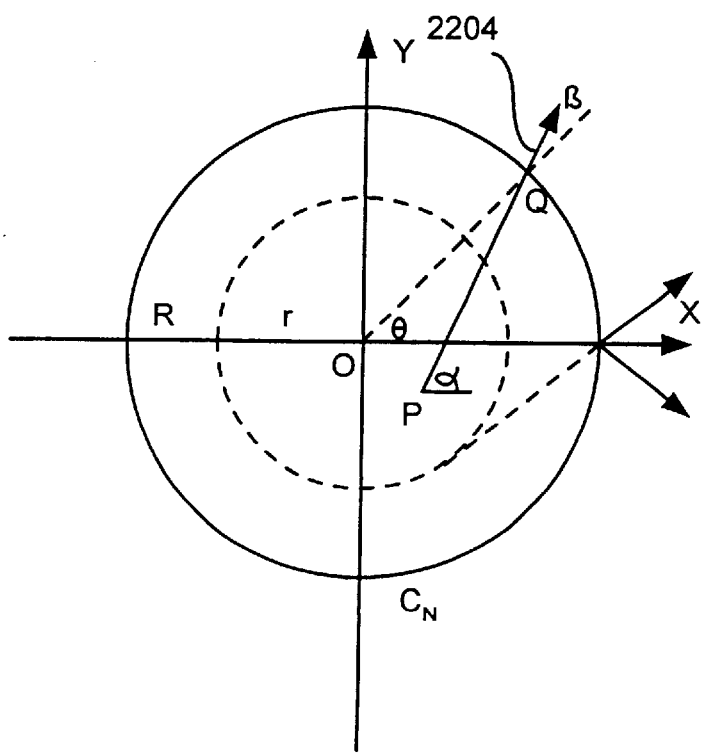
FIG. 23 is a diagram illustrating a ray projected from the novel viewpoint of FIG. 22 through a point Q on a camera path.

In step 2102 (FIG. 21) a ray direction from a novel viewpoint is calculated. Turning briefly to FIGS. 22 and 23, a novel viewpoint P is shown. The novel viewpoint has a viewing direction 2200 and a horizontal field of view 2202. An image is displayed to the user as if a camera took the image at point P in the desired viewing direction. However, since there is no image data corresponding to point P, the image needs to be created. To create the image from the novel viewpoint, a first ray direction, such as ray direction 2204, is calculated using the viewing direction 2200 and the horizontal field of view 2202, as is further described below.

In a next step 2104 (FIG. 21), image data is obtained from the sequence of images that has a ray direction substantially aligning with the ray direction from the novel viewpoint. Again turning to FIG. 23, the ray 2204 intersects the camera path at a point Q. The point Q has an associated angle θ and an image exists in the sequence of images that was captured at or close to the angle θ. Next, a determination is made as to which β in the image has a ray direction that substantially aligns with the ray direction 2204 (step 2106). Once the value of β is determined, the corresponding image data associated with β is used to create a portion of an image from the novel viewpoint (step 2108).

Figure 24:
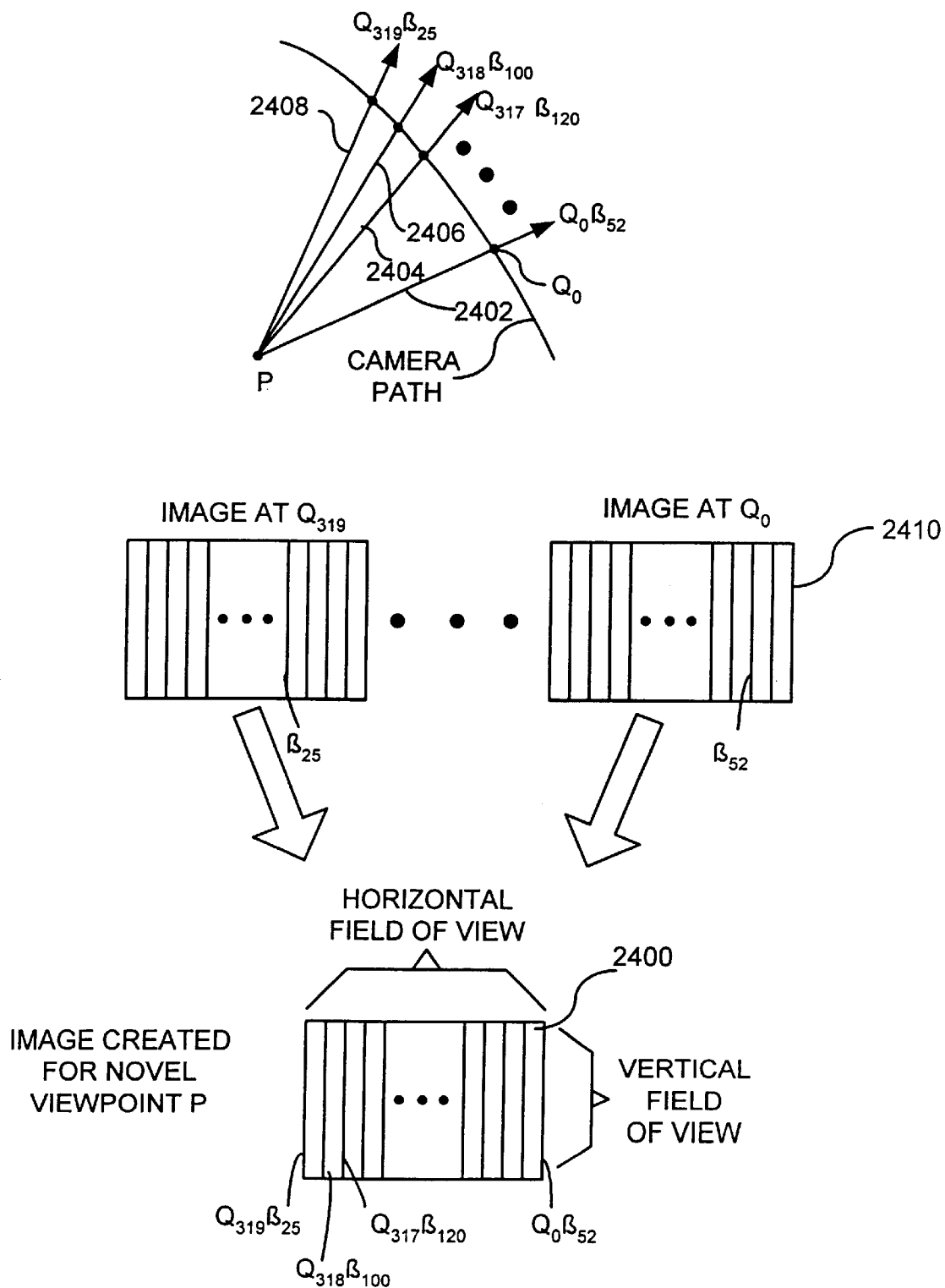
FIG. 24 is a diagram illustrating multiple rays projected from the novel viewpoint of FIG. 22 and using the projected rays to render an image.

FIG. 23, however, only shows a single ray direction, which cannot be used to render an entire image. FIG. 24 shows how the technique may be used for rendering an entire image from a novel viewpoint. Specifically, FIG. 24 shows an enlargement of the novel viewpoint P of FIG. 23 with multiple ray directions intersecting the camera path at points Q for creating an entire image 2400 as seen from the novel viewpoint. The image 2400 is shown as being 320 pixels wide, but other pixel widths may be used as already described. FIG. 24 shows that multiple ray directions, such as 2402, 2404, 2406, and 2408 are projected from the novel viewpoint P to obtain multiple values of β. Although only four ray directions are shown, 320 different values of β are obtained since image 2400 is 320 pixels wide. That is, each value of β represents a different image line in the rendered image 2400. A first ray direction 2402 corresponds to an image associated with point $Q_0$. Specifically, the point $Q_0$ has a corresponding θ that is associated with an image 2410 from the sequence of images. One of the angles β in the image 2410 either aligns with or closely aligns with the ray direction 2402. Details on how to calculate the proper β are described further below. For purposes of illustration, assume $\beta_{52}$ is found to substantially align with the ray direction 2402. Thus, the image line associated with $\beta_{52}$ is added to the image 2400. Assuming ray 2402 is the right-most ray in the horizontal field of view, the image line 52 is added to the right-most side of image 2400. The image 2400 has 320 such image lines that are similarly determined. Thus, the image 2400 created at the novel viewpoint is a combination of image lines and many of these image lines come from different images in the sequence of images. Continuing with the example of FIG. 24, the last three values of β calculated are shown. A ray direction 2404 intersects the circular path at a point $Q_{317}$ and substantially aligns with a second image line $\beta_{120}$. The image line $Q_{317}\beta_{120}$ is inserted into the image 2400 for the novel viewpoint. Similarly, the image lines $Q_{318}\beta_{100}$ and $Q_{319}\beta_{25}$ are determined and combined with the other image lines in the image 2400. The images associated with the different values of Q may be the same image or different images. For example, the image associated with $Q_{318}$ may be the same image associated with $Q_{319}$. Additionally, $\beta_{25}$ may be a different β than $\beta_{100}$ or it may be the same β. Often the Q point will not match up exactly with an image taken by the camera at that point. As a result, the closest image to the point Q is used or interpolation between the images is used. Likewise, the ray directions, such as rays 2406 and 2408, may not align exactly with the βs such as $\beta_{100}$ and $\beta_{25}$. Consequently, the closest β that aligns with the rays is used or interpolation between the βs is used (in either event, this β is said to "substantially align"). Using this technique, an image 2400 as seen at the novel viewpoint is created.

FIG. 25 is a flow chart showing additional steps that may be used to render an image from a novel point of view. Some of these steps may overlap with steps already described. In step 2502, a sequence of images is captured by moving a camera in a circular path as already described above. In step 2504, each image is stored as a plurality of discrete image lines, such as the images shown in FIG. 17. Each image line has an angle β associated therewith and the angle corresponds to a ray direction.

In step 2506, a novel viewpoint and viewing direction are obtained from a user-input device. FIG. 22 shows that the viewing direction 2200 is the center of the horizontal field of view and thus represents a single angle. Additionally, the novel viewpoint P is represented by x and y coordinates.

In step 2508, a first ray direction is calculated by using the horizontal field of view and the viewing direction. For example, if the ray 2204 (FIG. 22) is the left-most ray in the horizontal field of view, then that ray is obtained by adding the angle for the viewing direction to one-half of the angle for the horizontal field of view. Other ray directions may be calculated by using the pixel width in the created image and dividing the horizontal field of view by this pixel width. This provides a necessary angle between each ray direction, which can be used to obtain any desired ray direction within the field of view.

In step 2510, a point where the ray from the novel viewpoint intersects the circular path is determined. Turning again to FIG. 23, the point Q is an example of such a point of intersection with ray 2204. In step 2512 a calculation is made to determine the image that most closely coincides with this intersection point at Q. This can be obtained by determining the angle θ as described below to determine the image number that most closely coincides with the intersection point. In a step 2514, having determined the correct image, a β is calculated that most closely aligns with the ray direction.

The angle θ and the image line β are determined with reference to FIG. 23. Given the normal direction setup of the camera, the small circular region with radius $r=R\sin(hFov/2)$ is covered by the camera motion. To find where a ray PQ is captured, we have $Q_x^2+Q_y^2=R^2$ $Q_y-P_y=\tan(\alpha)(Q_x-P_x)$ where the position of viewpoint P, and the viewing direction α are given via user input. Therefore, Q is located on the image $\theta=\alpha\tan2(Q_y,Q_x)$ at the vertical line $\beta=\alpha-\theta.$ FIG. 26 shows additional steps that can be used to render the image at the novel viewpoint. In a step 2602, the image line that was obtained in step 2514 is added to the image at the novel viewpoint. For example, turning briefly to FIG. 24, if the image line $Q_0B_{52}$ is obtained in step 2514, it is added to the image 2400.

In step 2604, a next ray direction is chosen so that the next image line may be obtained for the image 2400. In step 2606, a determination is made for the point where the ray from the novel viewpoint intersects the circular camera path and an angle θ is calculated for that point. In step 2608, the image that most closely corresponds to θ is obtained. In step 2610, the image line that most closely aligns with the ray direction is obtained from the image. In step 2612, a determination is made whether all of the image lines have been created for the new image. This depends on the resolution of the image. For example, in the current example, the image is 320 pixels wide so 320 different values of β need to be determined. As indicated by line 2613, this process continues for each new ray direction until the image for the novel viewpoint is completed. In step 2614, once the image is completed it is rendered and displayed to the user.

To render the image it may be desirable to use depth correction. Depth correction is described above in relation to FIGS. 12 and 13. For real scenes it may be desirable to use constant depth correction. If depth is estimated correctly, the aspect ratios of objects should remain the same after depth correction regardless of the distance between the object and the camera. The aspect ratio is a good approximation for frontal parallel objects and can be easily computed by identifying the boundary of the object in the image. The cross ratio of four co-linear points [Fau93] may be computed to verify if the perspective projection is preserved.

Figure 20:
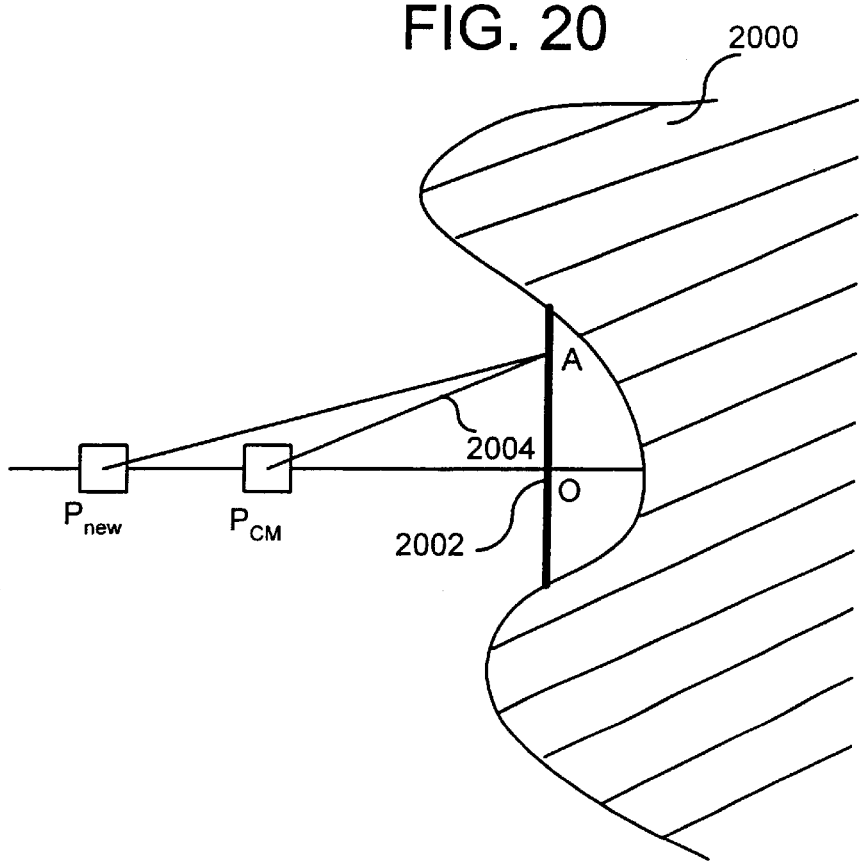
FIG. 20 is a diagram illustrating constant depth correction for images rendered from a novel viewpoint.
Figure 21:
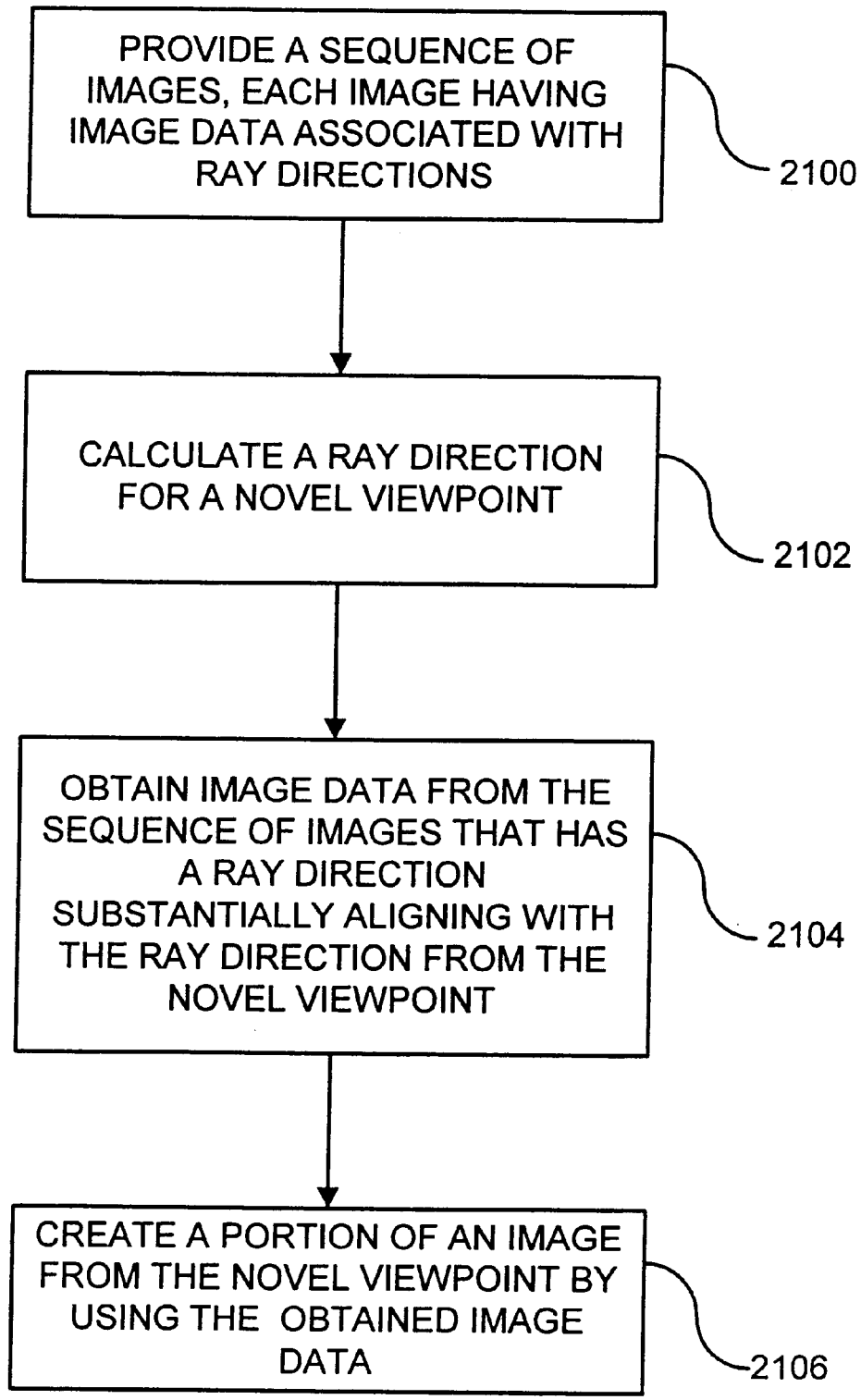
FIG. 21 is a flow chart of a method for rendering an image from a novel viewpoint using images captured from the camera of FIG. 15.

FIG. 20 illustrates constant depth correction. $P_{CM}$ represents a point where the camera 1502 takes an actual image. The distance from $P_{CM}$ to an object 2000 is difficult to determine in practice. Consequently, an initial assumption is made about this distance. In FIG. 20, the object is assumed to be at a constant distance indicated by line 2002. A ray 2004 is shown extending from $P_{CM}$ to a point A on the line 2002. Notably, the point A is not actually on the object 2000. In practice, the assumed distance is often wrong, which causes some distortion in the rendered image. To correct this distortion, the system allows the user to modify the distance by pull-down menus or other user interface techniques. Thus, the user is provided with the ability to change the depth so as to minimize distortion. When the user selects a desired distance, all of the image lines in the image are scaled accordingly. This allows the user to view a scene in different ways. For example, the user can focus on an object of interest in the same way a zoom lens can be used to focus on an object, while other objects in the image may have distortion. This approach is essentially a cylindrical texture map that updates its content based on the location of the novel view. If the depth is estimated correctly, the aspect ratios of objects remain the same after depth correction regardless of the distance between the object and the camera. When rendering an image from $P_{NEW}$, the image lines are scaled by the ratio $OP_{cm}/OP_{new}$ Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

For example, although the image lines are shown as being 1 pixel wide, the width of the image lines can vary (e.g., 2, 3, 4, pixels).

Additionally, although the camera or cameras are shown as being moved in a circle, this is not necessarily the case. For example, the invention is also applicable to camera or cameras moving in other configurations, such as squares, ellipses, etc.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope of the following claims and equivalents thereto.

References

[AB91] E. H. Adelson and J. Bergen. The plenoptic function and the elements of early vision. In *Computational Models of Visual Processing*, pages 3–20. MIT Press, Cambridge, Mass., 1991.

[Ben83] S. A. Benton. Survey of holographic stereograms. In *Proc. SPIE Vol. 367 Int. Soc. Eng.*, pages 15–19, 1983.

[BTZ96] P. Beardsley, P. Torr, and A. Zisserman. 3D model acquisition from extended image sequences. In *Fourth European Conference on Computer Vision* (ECCV'96), volume 2, pages 683–695, Cambridge, England, April 1996. Springer-Verlag.

[Chen95] S. Chen. Quicktime VR. In *Computer Graphics Proceedings, Annual Conference Series*, pages 29–38, Proc. SIGGRAPH'95, August 1995. ACM SIGGRAPH.

[CW93] S. Chen and L. Williams. View interpolation for image synthesis. *Computer Graphics* (SIGGRAPH'93), pages 279–288, August 1993.

[DTM96] P. E. Debevec, C. J. Taylor, and J. Malik. Modeling and rendering architecture from photographs: A hybrid geometry-and image-based approach. *Computer Graphics* (SIGGRAPH'96), pages 11–20, August 1996.

[Fau93] O. Faugeras. *Three-dimensional computer vision: A geometric viewpoint*. MIT Press, Cambridge, Mass., 1993.

[FSL+98] O. D. Faugeras, Laveau S., Robert L., Csurka G., and Zeller C. 3-D reconstruction of urban scenes from sequences of images. *Computer Vision and Image Understanding*, 69(3):292–309, March 1998.

[GGSC96] S. J. Gortler, R. Grzeszczuk, R. Szeliski, and M. F. Cohen. The lumigraph. In *Computer Graphics Proceedings, Annual Conference Series*, pages 43–54, Proc. SIGGRAPH'96 (New Orleans), August 1996. ACM SIGGRAPH.

[GH97] R. Gupta and R. I. Hartley. Linear pushbroom cameras. *IEEE Transactions on Pattern Analysis and Machine Intelligence*, 19(9):963–975, September 1997.

[KS96] S. B. Kang and R. Szeliski. 3-D scene data recovery using omnidirectional multibaseline stereo. In *IEEE Computer Society Conference on Computer Vision and Pattern Recognition* (CVPR'96), pages 364–370, San Francisco, Calif., June 1996.

[LF94] S. Laveau and O. Faugeras. 3-D scene representation as a collection of images and fundamental matrices. Technical Report 2205, INRIA-Sophia Antipolis, February, 1994.

[LH96] M. Levoy and P. Hanrahan. Light field rendering. In *Computer Graphics Proceedings, Annual Conference Series*, pages 31–42, Proc. SIGGRAPH'96 (New Orleans), August 1996. ACM SIGGRAPH.

[MB95] L. McMillan and G. Bishop. Plenoptic modeling: An image-based rendering system. *Computer Graphics* (SIGGRAPH'95), pages 39–46, August 1995.

[MP94] S. Mann and R. W. Picard. Virtual bellows: constructing high-quality images from video. In *First IEEE International Conference on Image Processing* (ICIP-94), volume I, pages 363–367, Austin, Tex., November 1994.

[Nal96] V. S. Nalwa. A true omnidirectional viewer. Technical report, Bell Laboratories, Homdel, N.J., USA, February 1996.

[Nay97] S. Nayar. Catadioptric omnidirectional camera. In *IEEE Computer Society Conference on Computer Vision and Pattern Recognition* (CVPR'97), pages 482–488, San Juan, Puerto Rico, June 1997.

[PH97] S. Peleg and J. Herman. Panoramic mosaics by manifold projection. In *IEEE Computer Society Conference on Computer Vision and Pattern Recognition* (CVPR'97), pages 338–343, San Juan, Puerto Rico, June 1997.

[RG98] P. Rademacher and G. Bishop. Multiple-center-of-projection images. In *Computer Graphics Proceedings, Annual Conference Series*, pages 199–206, Proc. SIGGRAPH'98 (Orlando), July 1998. ACM SIGGRAPH.

[RPIA98] B. Rousso, S. Peleg, Finci I., and Rav-Acha A. Universal mosaicing using pipe projection. In *Sixth International Conference on Computer Vision* (ICCV'98), pages 945–952, Bombay, January 1998.

[SCG97] P. P. Sloan, M. F. Cohen, and S. J. Gortler. Time critical lumigraph rendering. In *Symposium on Interactive 3D Graphics*, pages 17–23, Providence, R.I., USA, 1997.

[SD96] S. M. Seitz and C. M. Dyer. View morphing. In *Computer Graphics Proceedings, Annual Conference Series*, pages 21–30, Proc. SIGGRAPH'96 (New Orleans), August 1996. ACM SIGGRAPH.

[SGHS98] J. Shade, S. Gortler, L. He, and R. Szeliski. Layered depth images. In *Computer Graphics (SIGGRAPH'98) Proceedings*, pages 231–242, Orlando, July 1998. ACM SIGGRAPH.

[SS97] R. Szeliski and H. Shum. Creating full view panoramic image mosaics and texture-mapped models. In *Computer Graphics Proceedings, Annual Conference Series*, pages 251–258, Proc. SIGGRAPH'97, August 1997. ACM SIGGRAPH.

[SWI97] Y. Sato, M. Wheeler, and K. Ikeuchi. Object shape and reflectance modeling from observation. In *Computer Graphics Proceedings, Annual Conference Series*, pages 379–387, Proc. SIGGRAPH'97 (Los Angeles), August 1997. ACM SIGGRAPH.

[Sze96] R. Szeliski. Video mosaics for virtual environments. *IEEE Computer Graphics and Applications*, pages 22–30, March 1996.

[W+97] D. N. Wood et al. Multiperspective panoramas for cel animation. In *Computer Graphics Proceedings, Annual Conference Series*, pages 243–250, Proc. SIGGRAPH'97 (Los Angeles), August 1997. ACM SIGGRAPH.

[WHON97] T. Wong, P. Heng, S. Or, and W. Ng. Image-based rendering with controllable illumination. In *Proceedings of the 8th Eurographics Workshop on Rendering*, pages 13–22, St. Etienne, France, June 1997.

[XT97] Y. Xiong and K. Turkowski. Creating image-based VR using a self-calibrating fisheye. In *IEEE Computer Society Conference on Computer Vision and Pattern Recognition* (CVPR'97), pages 237–243, San Juan, Puerto Rico, June 1997.

[YM98] Y. Yu and J. Malik. Recovering photometric properties of architectural scenes from photographs. *Computer Graphics* (SIGGRAPH'96), pages 207–218, July 1998.

[ZT90] Zheng and S. Tsuji. Panoramic representation of scenes for route understanding. In *Proc. of the $10^{th}$ Int. Conf. Pattern Recognition*, pages 161–167, June 1990.

What is claimed is:

1. A computer-implemented process for rendering novel views of a 3D scene, comprising:

generating a series of concentric mosaics each of which comprises a plurality of slit images that collectively depict the surrounding 3D scene, the series including at least a first mosaic of first slit images taken at a first radius and a second mosaic of second slit images taken at a second radius, wherein the second radius is different from the first radius; and rendering novel views of the 3D scene from viewpoints within circular regions defined by the series of concentric mosaics using the plurality of slit images, wherein the novel views are rendered for radii different from the radii at which the slit images were taken.

2. The process of claim 1, wherein the step of generating the series of concentric mosaics comprises:

capturing a view of a separate portion of the 3D scene from a different viewpoint on a concentric circle disposed on a circle plane within the 3D scene to create each slit image of the plurality of slit images making up each concentric mosaic, wherein the view captured is in a direction tangent to the concentric circle; and uniquely indexing each of the slit images.

3. The process of claim 2, wherein there are two concentric mosaics associated with each concentric circle, and wherein capturing comprises:

capturing a view of a separate portion of the 3D scene in a first direction tangent to the concentric circle for a first of the concentric mosaics associated with a concentric circle; and capturing a view of a separate portion of the 3D scene in a second direction which is tangent to the concentric circle, and opposite the first tangent direction, for a second of the concentric mosaics associated with the concentric circle.

4. The process of claim 2, wherein each slit image has an elongated rectangular shape and is centered longitudinally about the circle plane.

5. The process of claim 4, wherein each slit image has a width characterized by a lateral field of view having a prescribed angle that is a portion of a 360 degree view of the surrounding 3D scene, and a height characterized by a longitudinal field of view of a predetermined angle.

6. The process of claim 5, wherein said prescribed angle is between about 0.12 degrees to about 0.36 degrees.

7. The process of claim 2, wherein uniquely indexing each of the slit images comprises the step of specifying a radial location and an angle of rotation for each slit image, wherein the radial location is defined as the radius of the concentric center on which the slit image was captured and the angle of rotation is defined as the number of degrees from a prescribed beginning on said concentric circle to the viewpoint from which the slit image was captured.

8. The process of claim 7, wherein uniquely indexing each of the slit images further comprises the step of specifying which of two possible directions tangent to said concentric circle that the slit image was captured.

9. The process of claim 1, wherein the 3D scene is real and the slit images are captured using cameras.

10. The process of claim 1, wherein the 3D scene is computer generated and the slit images are synthesized.

11. The process of claim 1, wherein each of the novel views is comprised of a series of slit images, and wherein rendering novel views of the 3D scene comprises:

ascertaining which of the slit images needed for a novel view coincide with a previously captured slit image;

ascertaining which of the slit images needed for the novel view do not coincide with one of the captured slit images;

interpolating slit images needed for the novel view from pairs of captured slit images whenever a slit image needed for the novel view does not coincide with one of the captured slit images; and placing the captured slit images ascertained to coincide with slit images needed for a novel view, and the interpolated slit images, in a side-by-side arrangement so as to collectively form an image of a portion of the 3D scene which represents the novel view.

12. The process of claim 11, wherein a slit image is identified by a ray traversing the circular regions formed by the concentric mosaics, said ray originating at the viewpoint of the slit image on the circle plane and extending toward a longitudinal midline of the slit image, and wherein the step of ascertaining which of the slit images needed for a novel view coincide with a captured slit image comprises:

specifying rays emanating from a viewpoint associated with a novel view that identify slit images needed to construct the novel view;

specifying the rays identifying each of the captured slit images;

finding rays identifying any captured slit image that coincides with one of the rays identifying the slit images that are needed to form the novel view;

associating any captured slit image whose ray is found to be coinciding with the coinciding ray emanating from the viewpoint of the novel view.

13. The process of claim 11, wherein a slit image is identified by a ray traversing the circular regions formed by the concentric mosaics, said ray originating at the viewpoint of the slit image on the circle plane and extending toward a longitudinal midline of the slit image, and wherein ascertaining which of the slit images needed for the novel view do not coincide with one of the captured slit images comprises finding rays emanating from a viewpoint associated with a novel view that identify slit images needed to construct the novel view which do not coincide with any of the rays identifying the locations of the captured slit images.

14. The process of claim 13, wherein the step of interpolating slit images needed for the novel view from pairs of captured slit images comprises, for each non-coinciding ray found:

identifying two rays which are parallel to the non-coinciding ray, and which respectively originate from viewpoints on concentric circles of the circle plane lying on either side of the non-coinciding ray;

determining the distance separating the non-coinciding ray from each of the parallel rays;

computing a ratio for each slit image identified by one of the parallel rays based on the relative distance between the non-coinciding ray and each of the parallel rays, wherein the ratio specifies how much weight the associated slit image is to be given in generating an interpolated slit image needed to construct a part of the novel view;

blending the slit images associated with the parallel rays to form the interpolated slit image, wherein the contribution of each slit image to the interpolated slit image is dictated by the ratio computed for that slit image; and associating the interpolated slit image with the non-coinciding ray.

15. The process of claim 11, wherein rendering novel views of the 3D scene further comprises, prior to placing the captured slit images ascertained to coincide with slit images needed for a novel view, and the interpolated slit images, in a side-by-side arrangement, scaling said slit images to compensate for any distortions caused as the result of the viewpoint of the novel view not coinciding with the viewpoints of the slit images being used to construct the novel view.

16. The process of claim 15, wherein generating the series of concentric mosaics comprises ascertaining a first average distance from the viewpoint of each captured slit image to the objects of the 3D scene depicted therein, and wherein the scaling step comprises:

for each captured slit image ascertained to coincide with one of the slit images needed for a novel view and each interpolated slit image, determining a second average distance from the objects of the 3D scene depicted in the slit image to the viewpoint of the novel view being rendered;

computing a ratio by dividing the first distance by the second distance;

scaling the longitudinal dimension of the slit image using the computed ratio.

17. A system for rendering novel views of a 3D scene, comprising:

a general purpose computing device;

a computer program comprising program modules executable by the computing device, wherein the computing device is directed by the program modules of the computer program to:

generate a series of different concentric mosaics each of which comprises a plurality of slit images that collectively depict the surrounding 3D scene; and render novel views of the 3D scene from viewpoints within circular regions defined by the series of concentric mosaics using the plurality of slit images, wherein the novel views have viewpoints with radii different from radii of the slit images.

18. The system of claim 17, wherein the program module for generating the series of concentric mosaics comprises sub-modules for:

capturing a view of a separate portion of the 3D scene from a different viewpoint on a concentric circle disposed on a circle plane within the 3D scene to create each slit image of the plurality of slit images making up each concentric mosaic, wherein the view captured is in a direction tangent to the concentric circle; and uniquely indexing each of the slit images.

19. The system of claim 18, wherein there are two concentric mosaics associated with each concentric circle, and wherein the capturing sub-module comprises sub-modules for:

capturing a view of a separate portion of the 3D scene in a first direction tangent to the concentric circle for a first of the concentric mosaics associated with a concentric circle; and capturing a view of a separate portion of the 3D scene in a second direction which is tangent to the concentric circle, and opposite the first tangent direction, for a second of the concentric mosaics associated with the concentric circle.

20. The system of claim 18, wherein each slit image has an elongated rectangular shape and is centered longitudinally about the circle plane.

21. The system of claim 20, wherein each slit image has a width characterized by a lateral field of view having a prescribed angle that is a portion of a 360 degree view of the surrounding 3D scene, and a height characterized by a longitudinal field of view of a predetermined angle.

22. The system of claim 21, wherein said prescribed angle is between about 0.12 degrees to about 0.36 degrees.

23. The system of claim 18, wherein the sub-module for uniquely indexing each of the slit images comprises a sub-module for specifying a radial location and an angle of rotation for each slit image, wherein the radial location is defined as the radius of the concentric center on which the slit image was captured and the angle of rotation is defined as the number of degrees from a prescribed beginning on said concentric circle to the viewpoint from which the slit image was captured.

24. The system of claim 23, wherein the sub-module for uniquely indexing each of the slit images further comprises a sub-module for specifying which of two possible directions tangent to said concentric circle that the slit image was captured.

25. The system of claim 17, wherein the 3D scene is real and the slit images are captured using cameras.

26. The system of claim 17, wherein the 3D scene is computer generated and the slit images are synthesized.

27. The system of claim 17, wherein each of the novel views is comprised of a series of slit images, and wherein the program module for rendering novel views of the 3D scene comprises sub-modules for:

ascertaining which of the slit images needed for a novel view coincide with a previously captured slit image;

ascertaining which of the slit images needed for the novel view do not coincide with one of the captured slit images;

interpolating slit images needed for the novel view from pairs of captured slit images whenever a slit image needed for the novel view does not coincide with one of the captured slit images; and placing the captured slit images ascertained to coincide with slit images needed for a novel view, and the interpolated slit images, in a side-by-side arrangement so as to collectively form an image of a portion of the 3D scene which represents the novel view.

28. The system of claim 27, wherein a slit image is identified by a ray traversing the circular regions formed by the concentric mosaics, said ray originating at the viewpoint of the slit image on the circle plane and extending toward a longitudinal midline of the slit image, and wherein the sub-module for ascertaining which of the slit images needed for a novel view coincide with a captured slit image comprises sub-modules for:

specifying rays emanating from a viewpoint associated with a novel view that identify the slit images needed to construct the novel view;

specifying the rays identifying each of the captured slit images;

finding rays identifying any captured slit image that coincides with one of the rays identifying the slit images that are needed to form the novel view;

associating any captured slit image whose ray is found to be coinciding with the coinciding ray emanating from the viewpoint of the novel view.

29. The system of claim 27, wherein a slit image is identified by a ray traversing the circular regions formed by the concentric mosaics, said ray originating at the viewpoint of the slit image on the circle plane and extending toward a longitudinal midline of the slit image, and wherein the sub-module for ascertaining which of the slit images needed for the novel view do not coincide with one of the captured slit images comprises a sub-module for finding rays emanating from a viewpoint associated with a novel view that identify slit images needed to construct the novel view which do not coincide with any of the rays identifying the locations of the captured slit images.

30. The system of claim 29, wherein the sub-module for interpolating slit images needed for the novel view from pairs of captured slit images comprises, for each non-coinciding ray found, sub-modules for:

identifying two rays which are parallel to the non-coinciding ray, and which respectively originate from viewpoints on concentric circles of the circle plane lying on either side of the non-coinciding ray;

determining the distance separating the non-coinciding ray from each of the parallel rays;

computing a ratio for each slit image identified by one of the parallel rays based on the relative distance between the non-coinciding ray and each of the parallel rays, wherein the ratio specifies how much weight the associated slit image is to be given in generating an interpolated slit image needed to construct a part of the novel view;

blending the slit images associated with the parallel rays to form the interpolated slit image, wherein the contribution of each slit image to the interpolated slit image is dictated by the ratio computed for that slit image; and associating the interpolated slit image with the non-coinciding ray.

31. The system of claim 27, wherein the program module for rendering novel views of the 3D scene further comprises, prior to executing the sub-module for placing the captured slit images ascertained to coincide with slit images needed for a novel view, and the interpolated slit images, in a side-by-side arrangement, executing a sub-module for scaling said slit images to compensate for any distortions caused as the result of the viewpoint of the novel view not coinciding with the viewpoints of the slit images being used to construct the novel view.

32. The system of claim 31, wherein the program module for generating the series of concentric mosaics comprises a sub-module for ascertaining a first average distance from the viewpoint of each captured slit image to the objects of the 3D scene depicted therein, and wherein the scaling sub-module comprises sub-modules for:

determining a second average distance from the objects of the 3D scene depicted in the slit image to the viewpoint of the novel view being rendered for each captured slit image ascertained to coincide with one of the slit images needed for a novel view and each interpolated slit image;

computing a ratio by dividing the first distance by the second distance;

scaling the longitudinal dimension of the slit image using the computed ratio.

33. A computer-readable memory for rendering novel views of a 3D scene, comprising:

a computer-readable storage medium; and a computer program comprising program modules stored in the storage medium, wherein the storage medium is so configured by the computer program that it causes a computer to, generate a series of different concentric mosaics each of which comprises a plurality of slit images that collectively depict the surrounding 3D scene; and render novel views of the 3D scene from viewpoints within circular regions defined by the series of concentric mosaics using the plurality of slit images.

34. The computer-readable memory of claim 33, wherein the program module for generating the series of concentric mosaics comprises sub-modules for:

capturing a view of a separate portion of the 3D scene from a different viewpoint on a concentric circle disposed on a circle plane within the 3D scene to create each slit image of the plurality of slit images making up each concentric mosaic, wherein the view captured is in a direction tangent to the concentric circle; and uniquely indexing each of the slit images.

35. The computer-readable memory of claim 34, wherein there are two concentric mosaics associated with each concentric circle, and wherein the capturing sub-module comprises sub-modules for:

capturing a view of a separate portion of the 3D scene in a first direction tangent to the concentric circle for a first of the concentric mosaics associated with a concentric circle; and capturing a view of a separate portion of the 3D scene in a second direction which is tangent to the concentric circle, and opposite the first tangent direction, for a second of the concentric mosaics associated with the concentric circle.

36. The computer-readable memory of claim 34, wherein each slit image has an elongated rectangular shape and is centered longitudinally about the circle plane.

37. The computer-readable memory of claim 36, wherein each slit image has a width characterized by a lateral field of view having a prescribed angle that is a portion of a 360 degree view of the surrounding 3D scene, and a height characterized by a longitudinal field of view of a predetermined angle.

38. The computer-readable memory of claim 37, wherein said prescribed angle is between about 0.12 degrees to about 0.36 degrees.

39. The computer-readable memory of claim 34, wherein the sub-module for uniquely indexing each of the slit images comprises a sub-module for specifying a radial location and an angle of rotation for each slit image, wherein the radial location is defined as the radius of the concentric center on which the slit image was captured and the angle of rotation is defined as the number of degrees from a prescribed beginning on said concentric circle to the viewpoint from which the slit image was captured.

40. The computer-readable memory of claim 39, wherein the sub-module for uniquely indexing each of the slit images further comprises a sub-module for specifying which of two possible directions tangent to said concentric circle that the slit image was captured.

41. The computer-readable memory of claim 33, wherein the 3D scene is real and the slit images are captured using cameras.

42. The computer-readable memory of claim 33, wherein the 3D scene is computer generated and the slit images are synthesized.

43. The computer-readable memory of claim 33, wherein each of the novel views is comprised of a series of slit images, and wherein the program module for rendering novel views of the 3D scene comprises sub-modules for:
   ascertaining which of the slit images needed for a novel view coincide with a previously captured slit image;
   ascertaining which of the slit images needed for the novel view do not coincide with one of the captured slit images;
   interpolating slit images needed for the novel view from pairs of captured slit images whenever a slit image needed for the novel view does not coincide with one of the captured slit images; and
   placing the captured slit images ascertained to coincide with slit images needed for a novel view, and the interpolated slit images, in a side-by-side arrangement so as to collectively form an image of a portion of the 3D scene which represents the novel view.

44. The computer-readable memory of claim 43, wherein a slit image is identified by a ray traversing the circular regions formed by the concentric mosaics, said ray originating at the viewpoint of the slit image on the circle plane and extending toward a longitudinal midline of the slit image, and wherein the sub-module for ascertaining which of the slit images needed for a novel view coincide with a captured slit image comprises sub-modules for:
   specifying rays emanating from a viewpoint associated with a novel view that identify slit images needed to construct the novel view;
   specifying the rays identifying each of the captured slit images;
   finding rays identifying any captured slit image that coincides with one of the rays identifying the slit images that are needed to form the novel view;
   associating any captured slit image whose ray is found to be coinciding with the coinciding ray emanating from the viewpoint of the novel view.

45. The computer-readable memory of claim 43, wherein a slit image is identified by a ray traversing the circular regions formed by the concentric mosaics, said ray originating at the viewpoint of the slit image on the circle plane and extending toward a longitudinal midline of the slit image, and wherein the sub-module for ascertaining which of the slit images needed for the novel view do not coincide with one of the captured slit images comprises a sub-module for finding rays emanating from a viewpoint associated with a novel view that identify slit images needed to construct the novel view which do not coincide with any of the rays identifying the locations of the captured slit images.

46. The computer-readable memory of claim 45, wherein the sub-module for interpolating slit images needed for the novel view from pairs of captured slit images comprises, for each non-coinciding ray found, sub-modules for:
   identifying two rays which are parallel to the non-coinciding ray, and which respectively originate from viewpoints on concentric circles of the circle plane lying on either side of the non-coinciding ray;
   determining the distance separating the non-coinciding ray from each of the parallel rays;
   computing a ratio for each slit image identified by one of the parallel rays based on the relative distance between the non-coinciding ray and each of the parallel rays, wherein the ratio specifies how much weight the associated slit image is to be given in generating an interpolated slit image needed to construct a part of the novel view;
   blending the slit images associated with the parallel rays to form the interpolated slit image, wherein the contribution of each slit image to the interpolated slit image is dictated by the ratio computed for that slit image; and
   associating the interpolated slit image with the non-coinciding ray.

47. The computer-readable memory of claim 43, wherein the program module for rendering novel views of the 3D scene further comprises, prior to executing the sub-module for placing the captured slit images ascertained to coincide with slit images needed for a novel view, and the interpolated slit images, in a side-by-side arrangement, executing a sub-module for scaling said slit images to compensate for any distortions caused as the result of the viewpoint of the novel view not coinciding with the viewpoints of the slit images being used to construct the novel view.

48. The computer-readable memory of claim 47, wherein the program module for generating the series of concentric mosaics comprises a sub-module for ascertaining a first average distance from the viewpoint of each captured slit image to the objects of the 3D scene depicted therein, and wherein the scaling sub-module comprises sub-modules for:
   determining a second average distance from the objects of the 3D scene depicted in the slit image to the viewpoint of the novel view being rendered for each captured slit image ascertained to coincide with one of the slit images needed for a novel view and each interpolated slit image;
   computing a ratio by dividing the first distance by the second distance;
   scaling the longitudinal dimension of the slit image using the computed ratio.

49. A method of rendering a 3D scene, comprising:
   (a) providing a sequence of images captured by moving a camera in a path around a point, the sequence of images including a plurality of image data, each having a ray direction associated therewith;

(b) calculating a ray direction from a novel viewpoint, wherein the distance between the novel viewpoint and the point is different from the distance between the camera and the point;

(c) obtaining the image data from the sequence of images that has a ray direction substantially aligned with the ray direction from the novel viewpoint; and (d) creating a portion of an image as seen from the novel viewpoint by using the obtained image data.

50. The method of claim 49 wherein the image data is a discrete image line formed by multiple pixels having the same ray direction.

51. The method of claim 49 wherein the camera moves in a circular path and further including determining a point of intersection between the circular path and a line extending from the novel viewpoint in the ray direction.

52. The method of claim 51 further including determining which image in the sequence of images is nearest the point of intersection.

53. The method of 49 wherein the ray direction from the novel viewpoint is a first ray direction and the method includes determining multiple ray directions, one for each pixel width in the created image.

54. The method of claim 49 wherein the camera moves in a circular path and further including calculating an angle θ, which is an angle associated with camera location on the circular path, by determining an intersection point between the circular path and a line extending from the novel viewpoint in the ray direction.

55. The method of claim 54 wherein the camera moves at a constant speed and the method further includes using the angle θ and the speed of the camera to determine which image in the sequence of images was taken closest to the intersection point.

56. The method of claim 49 including receiving a viewing direction from a user input device and using the viewing direction to calculate an angle α associated with the ray direction from the novel viewpoint.

57. The method of claim 49 further including calculating an angle β associated with a ray direction from the image data and using the angle β to select image data from one of the sequence of images.

58. The method of claim 49 further including obtaining a viewing direction from a user input device wherein the viewing direction represents the center of a horizontal field of view.

59. The method of claim 49 wherein the image data includes a plurality of image lines, each having a width of one pixel and a length equal to a vertical field of view.

60. The method of claim 59 wherein each image line has an angle β associated therewith, the angle β being associated with an angle that a light ray entered the camera.

61. The method of claim 59 wherein the image data includes a plurality of image lines, each having a width of one pixel and a length equal to a vertical field of view and the method further includes:

calculating a number of ray directions equal to a number of pixels in a width of the created image;

for each calculated ray direction, obtaining an image line having a ray direction that substantially aligns with the calculated ray direction;

combining the image lines together to form the image as seen from the novel viewpoint.

62. The method of claim 61 wherein the image lines are obtained from two or more different images in the sequence of images so that the created image is formed from a combination of image lines from different images.

63. The method of claim 49 wherein the image as seen from the novel view point is displayed to the user and the user can browse a scene captured by the sequence of images by moving a user input device and wherein the depth of objects in the scene is user-definable.

64. The method of claim 49 further including constructing concentric mosaics by combining image data that has the same ray direction from different images in the sequence of images.

65. The method of claim 64 wherein the creating step is accomplished using the concentric mosaics.

66. A computer-readable medium having computer-executable instructions for performing the steps recited in claim 49.

67. A method of rendering a 3D scene, comprising:

capturing images by moving at least one camera on a plane at a maximum radius R from a centerpoint through different angles of rotation;

monitoring for user input for a desired viewing point and viewing angle;

for a desired viewing point having a radius R' from the centerpoint, which is less than R, such that no actual image was captured at that point, creating a new image by combining light rays from at least two different captured images, wherein the new image is an approximation of an image that would have been captured by the camera had the camera been placed at the desired viewing point.

68. The method of claim 67 further including projecting a ray direction from the desired viewing point through an intersection point on a circle created by a camera path and determining an angle of rotation associated with the intersection point.

69. The method of claim 67 wherein the captured images include a plurality of discrete image lines having an index corresponding to an angle that a light ray entered the camera.

70. The method of claim 67 wherein the camera is a video camera.

71. The method of claim 67 wherein the camera is a slit-image camera.

72. The method of claim 67 wherein the capturing step includes rotating the camera around the center point at a constant speed.

73. A computer-readable medium having computer-executable instructions for performing the steps recited in claim 67.

74. A method of rendering a 3D scene, comprising:

providing a sequence of digital images associated with different viewpoints of a scene, the sequence captured by revolving a camera around a center point, the camera being spaced from the center point at a non-zero camera distance, and the digital images formed by discrete image lines; and creating an image as would be seen from a novel viewpoint of the scene by extracting the image lines from at least two of the digital images and combining the image lines from the different digital images to render the scene from the novel viewpoint, wherein the distance between the novel viewpoint and the center point is different from the non-zero camera distance.

75. The method of claim 74 wherein the sequence of digital images are video images taken by revolving a video camera to capture the scene.

76. The method of claim 74 wherein the creating step includes storing the sequence of digital images based on an angle.

77. A computer-readable medium having computer-executable instructions for performing the steps recited in claim 74.

78. The method of claim 74 further including using constant depth correction and wherein the depth is user-definable.

* * * * *